US010956530B2

(12) United States Patent
Pellow et al.

(10) Patent No.: US 10,956,530 B2
(45) Date of Patent: Mar. 23, 2021

(54) SYSTEMS AND METHODS FOR SEARCH MODIFICATION

(71) Applicant: Walmart Apollo, LLC, Bentonville, AR (US)

(72) Inventors: Benjamin J. Pellow, Ashland, OR (US); Binish Pillai, Sunnyvale, CA (US); Lynda L. Gathercoal, Poulsbo, WA (US); Yue Tian, San Jose, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/670,127

(22) Filed: Oct. 31, 2019

(65) Prior Publication Data

US 2020/0142945 A1     May 7, 2020

Related U.S. Application Data

(60) Provisional application No. 62/754,928, filed on Nov. 2, 2018, provisional application No. 62/754,910, filed
(Continued)

(51) Int. Cl.
*G06F 16/957* (2019.01)
*G06F 16/9532* (2019.01)
(Continued)

(52) U.S. Cl.
CPC ........ *G06F 16/9574* (2019.01); *G06F 3/0482* (2013.01); *G06F 8/34* (2013.01); *G06F 16/9532* (2019.01); *G06F 16/9538* (2019.01)

(58) Field of Classification Search
None
See application file for complete search history.

(56) References Cited

U.S. PATENT DOCUMENTS

D528,553 S    9/2006  Nevill-Manning
7,599,911 B2  10/2009 Manber
(Continued)

OTHER PUBLICATIONS

Feuz et al.; "Personal Web searching in the age of semantic capitalism: Diagnosing the mechanisms of personalisation."; In: First Monday; Feb. 7, 2011 (Feb. 7, 2011); https://firstmonday.org/ojs/index.php/fm/article/view/3344; pp. 1-25.
(Continued)

*Primary Examiner* — Justin S Lee
(74) *Attorney, Agent, or Firm* — Fitch, Even, Tabin & Flannery LLP

(57) ABSTRACT

In some embodiments, apparatuses and methods are provided herein useful to presenting search diagnostic tools in concert with a website. In some embodiments, a system for presenting search diagnostic tools in concert with a website comprises a server, wherein the server stores code for a website including a first code set including executable code for rendering the website and a second code set including executable code for rendering a user interface integrated with the rendering of the website including search diagnostic tools for the website, and a control circuit configured to receive a search query, receive results for the search query, output signals to cause rendering of the website, wherein the website includes the results for the search query, and output signals to cause rendering of the user interface including the search diagnostic tools such that the user interface is presenting with the search results for the search query.

22 Claims, 13 Drawing Sheets

Related U.S. Application Data on Nov. 2, 2018, provisional application No. 62/754,992, filed on Nov. 2, 2018, provisional application No. 62/755,000, filed on Nov. 2, 2018, provisional application No. 62/754,981, filed on Nov. 2, 2018.

(51) Int. Cl.
*G06F 3/0482* (2013.01)
*G06F 16/9538* (2019.01)
*G06F 8/34* (2018.01)

(56) References Cited

U.S. PATENT DOCUMENTS

| | | | |
|---|---|---|---|
| 7,720,845 B2 | 5/2010 | Stata | |
| 7,860,886 B2 | 12/2010 | Loftesness | |
| 8,095,582 B2 | 1/2012 | Cramer | |
| 8,370,334 B2 | 2/2013 | Ferrenq | |
| 8,620,891 B1 * | 12/2013 | Thirumalai | G06F 16/9535 |
| | | | 707/705 |
| 8,712,868 B2 | 4/2014 | Foster | |
| 8,892,552 B1 * | 11/2014 | Hansson | G06F 16/951 |
| | | | 707/732 |
| 9,053,158 B1 | 6/2015 | Lee | |
| 9,177,341 B2 | 11/2015 | Wiggins | |
| 9,189,548 B2 | 11/2015 | Tong | |
| D757,763 S | 5/2016 | Lim | |
| 9,330,404 B2 | 5/2016 | He | |
| 9,367,606 B1 | 6/2016 | Lu | |
| 9,536,259 B2 | 1/2017 | Collins | |
| 9,582,580 B2 * | 2/2017 | Lisa | G06F 3/0488 |
| 9,613,469 B2 | 4/2017 | Fish | |
| 9,635,089 B2 | 4/2017 | Rangappa | |
| D786,910 S | 5/2017 | Higuchi | |
| 9,672,552 B2 | 6/2017 | Warren | |
| 10,013,493 B1 * | 7/2018 | Gandhi | G06F 16/9535 |
| D829,736 S | 10/2018 | Jochetz | |
| D847,856 S | 5/2019 | Kim | |
| D849,765 S | 5/2019 | Lee | |
| D872,756 S | 1/2020 | Howell | |
| D875,753 S | 2/2020 | D'Costa | |
| D877,186 S | 3/2020 | Parks | |
| D878,411 S | 3/2020 | Lee | |
| D881,916 S | 4/2020 | Mead | |
| D881,918 S | 4/2020 | Mizutani | |
| 2003/0071837 A1 | 4/2003 | Sorensen | |
| 2006/0294071 A1 | 12/2006 | Weare | |
| 2008/0016098 A1 * | 1/2008 | Frieden | G06F 16/951 |
| 2008/0270356 A1 * | 10/2008 | Anderson | G06F 16/951 |
| 2009/0172514 A1 * | 7/2009 | Radovanovic | G06F 16/951 |
| | | | 715/212 |
| 2012/0095984 A1 * | 4/2012 | Wren-Hilton | G06F 16/9535 |
| | | | 707/707 |
| 2012/0221442 A1 | 8/2012 | Olejniczak | |
| 2013/0185175 A1 | 7/2013 | Roozen | |
| 2014/0025539 A1 | 1/2014 | Forsblom | |
| 2014/0114945 A1 * | 4/2014 | Riley | G06F 16/2425 |
| | | | 707/706 |
| 2014/0282255 A1 * | 9/2014 | Fish | G06F 3/048 |
| | | | 715/835 |
| 2014/0289211 A1 * | 9/2014 | Cao | G06F 16/3346 |
| | | | 707/706 |
| 2015/0066894 A1 * | 3/2015 | Riley | G06F 16/951 |
| | | | 707/709 |
| 2015/0170248 A1 | 6/2015 | Chung | |
| 2015/0234822 A1 | 8/2015 | Gargalhone | |
| 2016/0103928 A1 * | 4/2016 | Glasgow | G06F 40/186 |
| | | | 715/234 |
| 2016/0119192 A1 | 4/2016 | Tanoue | |
| 2016/0306801 A1 * | 10/2016 | Andrianakou | G06F 16/285 |
| 2017/0195744 A1 | 7/2017 | Engel | |
| 2018/0012355 A1 | 1/2018 | Sarkar | |
| 2018/0089711 A1 | 3/2018 | Watanabe | |
| 2018/0210965 A1 * | 7/2018 | Grigoryan | G06F 16/972 |
| 2018/0246977 A1 * | 8/2018 | Riley | G06F 16/24578 |
| 2020/0142945 A1 | 5/2020 | Pellow | |

OTHER PUBLICATIONS

PCT; App. No. PCT/US19/59003; International Search Report and Written Opinion dated Jan. 17, 2020.

InVisionApp Inc.; "A magical new design to development workflow with Inspect"; https://www.invisionapp.com/feature/inspect; Available at least as early as Aug. 2, 2018; pp. 1-8.

Owings, Justin; "How to Use Inspect Mode to Drive FullStory Search": https://blog.fullstory.com/how-to-use-inspect-mode-to-drive-fullstory-search; Apr. 5, 2017; pp. 1-4.

Amazon; "Amazon Home Page" https://web.archive.org/web/20180913211510/https://www.amazon.com; Available at least as early as Sep. 13, 2018; pp. 1-5.

U.S. Appl. No. 29/696,148, dated Jun. 25, 2019, Benjamin J. Pellow.

U.S. Appl. No. 29/696,150, dated Jun. 25, 2019, Benjamin J. Pellow.

U.S. Appl. No. 29/696,155, dated Jun. 25, 2019, Benjamin J. Pellow.

U.S. Appl. No. 29/696,156, dated Jun. 25, 2019, Benjamin J. Pellow.

Fullstory; "Search your customer experience like you search the web"; https://www.fullstory.com/features; Available at least as early as Aug. 6, 2018; pp. 1-10.

* cited by examiner

SYSTEMS AND METHODS FOR SEARCH MODIFICATION

RELATED APPLICATIONS

This application claims the benefit of U.S. Provisional Application No. 62/754,928, filed Nov. 2, 2018, U.S. Provisional Application No. 62/754,910, filed Nov. 2, 2018, U.S. Provisional Application No. 62/754,992, filed Nov. 2, 2018, U.S. Provisional Application No. 62/755,000, filed Nov. 2, 2018, U.S. Provisional Application No. 62/754,981, filed Nov. 2, 2018, which are incorporated by reference in their entirety herein.

TECHNICAL FIELD

This invention relates generally to websites presented via a web browser and, more particularly, search functionality of websites presented via web browsers.

BACKGROUND

Many websites include search functions for users. The search functions allow users to search, based on search queries, for content on the website and/or external to the website. For example, the search function of a retailer's website allows users to search for products offered for sale by the retailer and the search function of a search provider (e.g., Google or Yahoo) allows users to search for content across numerous websites. In either case (i.e., searching within a website and/or search across websites), the search function is typically capable of receiving complex search queries using varying operators in addition to plain language. However, typical users are most comfortable using plain language for search queries and, consequently, use plain language when searching via the search function. Unfortunately, plain language does not always yield the most relevant search results. Additionally, even if a user utilizes complex operators for his or her search, he or she is may not find what he or she is looking for.

Systems exist that allow computer programmers to alter the functionality of search engines to enhance the results received by users. However, such systems are complex and require specially trained engineers to alter the functionality of the search engine. Because existing systems are so complex, few people have the skill necessary to execute such changes which makes such search enhancement difficult and limited to few people. Consequently, a need exists for systems, methods, and apparatuses that make enhancing searches easier and accessible to more people.

BRIEF DESCRIPTION OF THE DRAWINGS

Disclosed herein are embodiments of systems, apparatuses, and methods pertaining to presenting search diagnostic tools in concert with a website. This description includes drawings, wherein.

Figure 1:
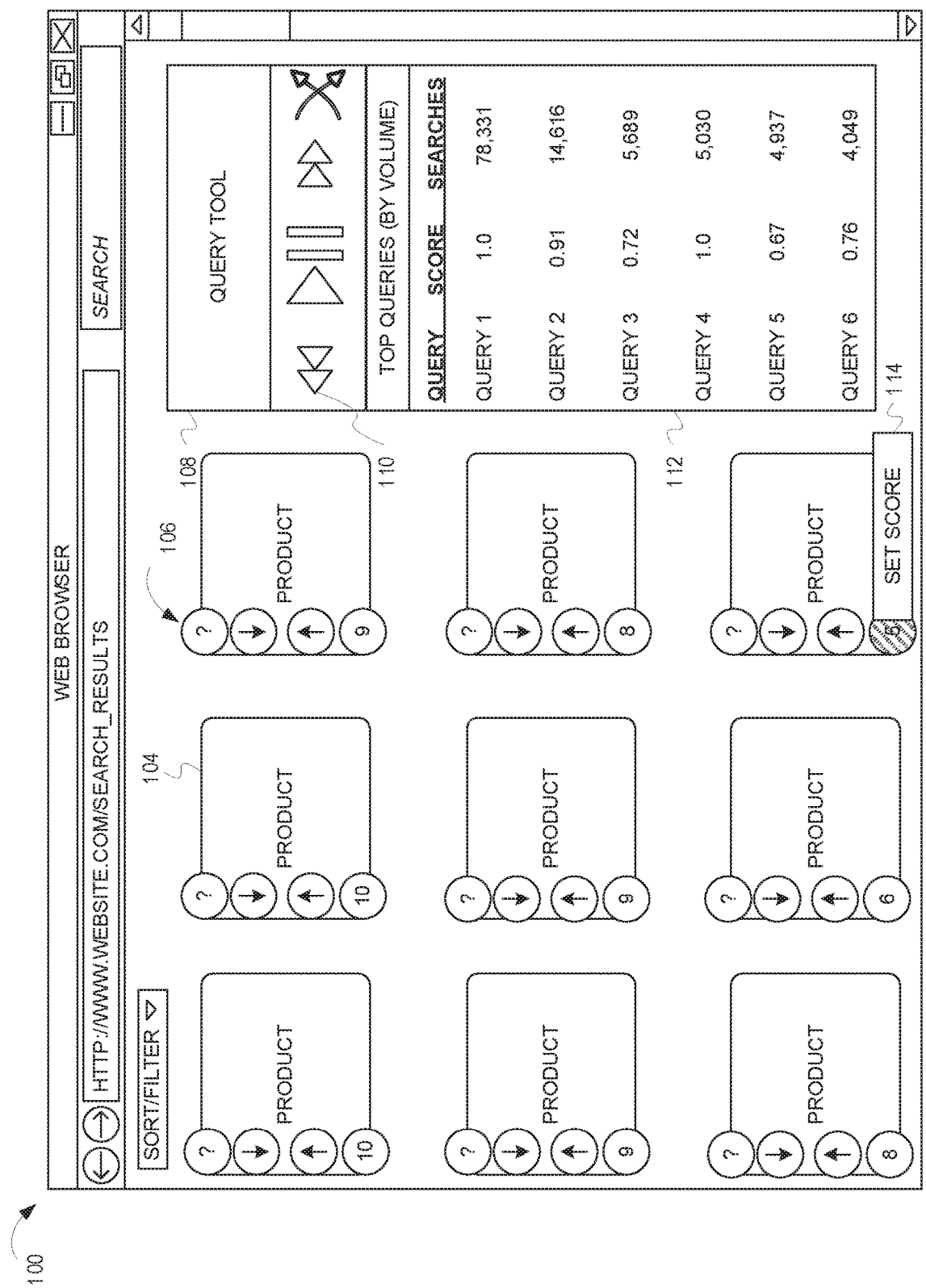
FIG. 1 depicts a webpage being presented via web browser 100 in concert with search diagnostic tools 106, according to some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses, and methods are provided herein useful to presenting search diagnostic tools in concert with a website. In some embodiments, a system for presenting search diagnostic tools in concert with a website comprises a server, wherein the server stores code for a website including a search function for users of the website, wherein the code for the web site includes a first code set and a second code set, wherein the first code set includes executable code for rendering the website including the search function and the second code set includes executable code for rendering a user interface integrated with the rendering of the website, and wherein the user interface includes search diagnostic tools for the website, and a control circuit, wherein the control circuit is configured to receive, from a user, a search query, receive, from a search engine, results for the search query, output based on execution of the first code set, signals to cause rendering of the website, wherein the website includes the results for the search query, and output, based on execution of the second code set, signals to cause rendering of the user interface including the search diagnostic tools such that the user interface including the search diagnostic tools is presenting with the search results for the search query.

Introduction

As previously discussed, many websites include search functions that allow users of the website to search for content. While the examples provided herein discuss search features that allow users to search for content contained within the website, it should be noted that the systems, methods, and apparatuses described herein can be used to facilitate and improve searches designed to find content across multiple websites. Typically, users utilize the search function using plain language. For example, a user of a retailer's website may enter "shoes" as a query when he or she is searching for shoes. The search results for this query may include shoes, as well as other products, such as shoe polish, shoe laces, boots, etc. If the user is interested in viewing only shoes, these other products may clutter the search and prevent the user from finding what he or she is looking for. Currently, if the retailer wanted to alter the results presented (i.e., the search results for the search query), the retailer would need to modify the functionality of the search engine. For example, the retailer could modify the ranking data for products in the search engine, the search algorithm, the data for products, configuration of pages, etc. While this may improve the search results, such modification is difficult to perform and requires a specially trained software engineer.

Embodiments of the systems, methods, and apparatuses described herein seek to minimize, or eliminate, the need for a specially trained software engineer to alter the search results. Instead, in some embodiments, a user interface is presented in concert with the website. The user interface includes search diagnostic tools for the website. In some embodiments, a user with only the ability to navigate a website would be able to manipulate searches using the search diagnostic tools.

In one example embodiment, the search diagnostic tools include a number of selections or buttons presented with search results for a search query. By selecting the selections or buttons, as well as performing other selections in some cases, a user can cause search queries to be modified. As one example, described in more detail below, the user can select a search result and have that search result "forced" to the top of the search results. In this way, when another user enters a search query, the search result "forced" to the top will be presented at the top of the search results. The user can "force" this search result to the top without modification to the search engine through the use of the search diagnostic tools presented in concert with the website.

Figure 2:
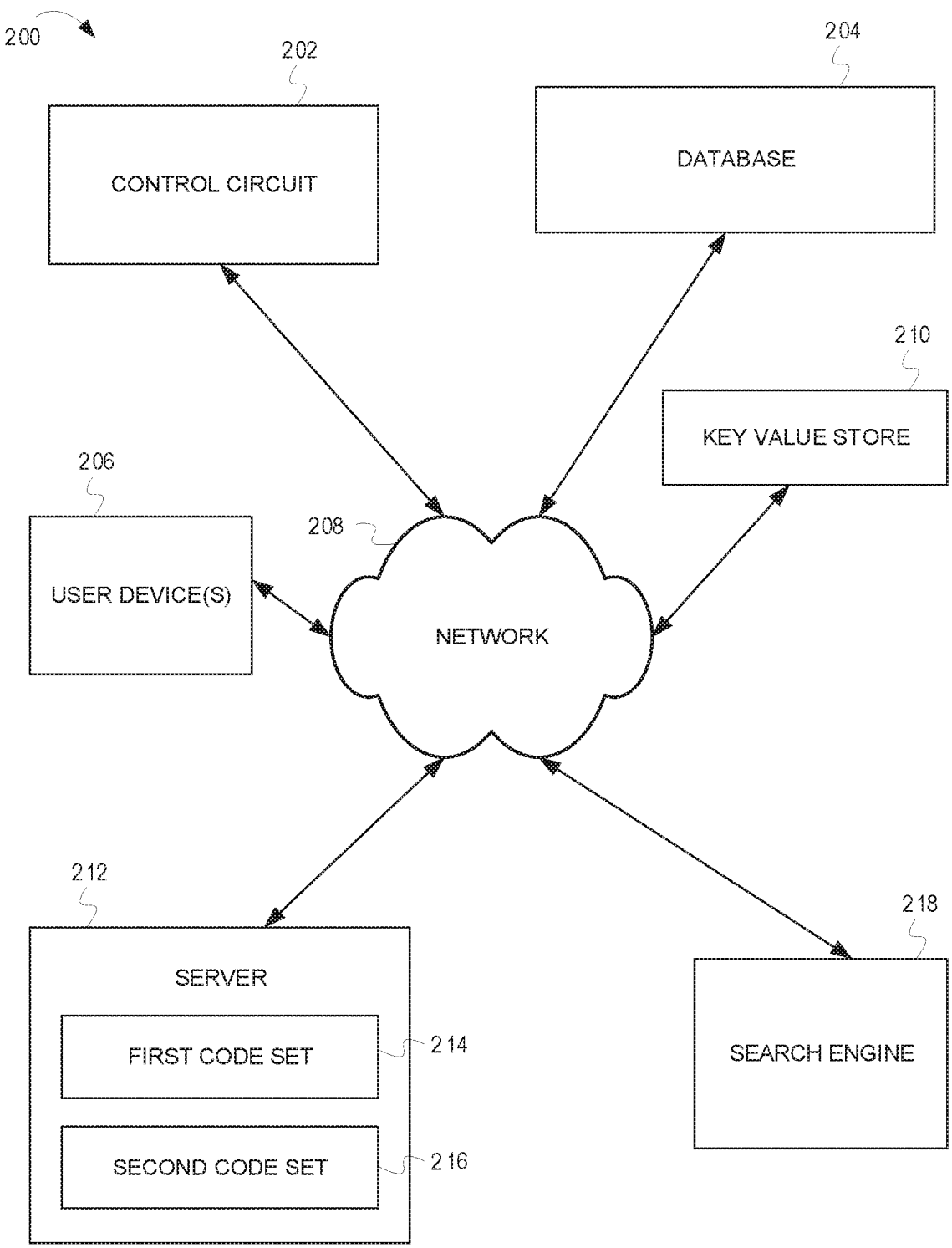
FIG. 2 is a block diagram of a system 200 for presenting search diagnostic tools in concert with a website, according to some embodiments.
Figure 3:
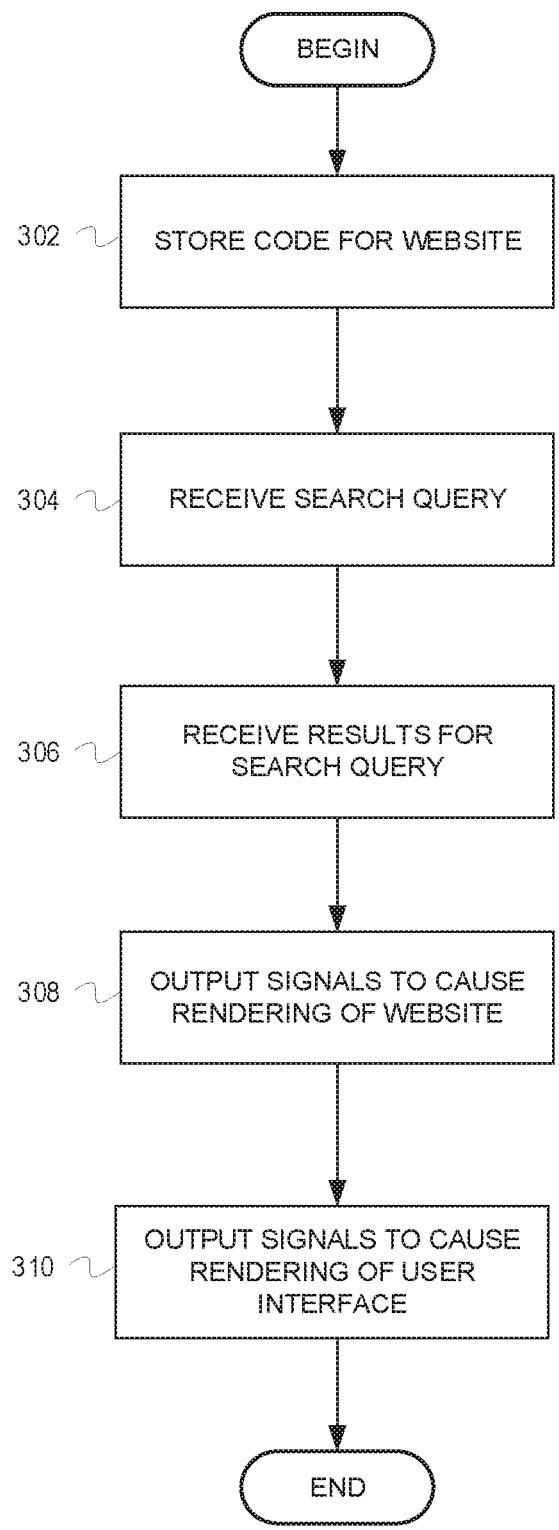
FIG. 3 is a flow chart including example operations for presenting search diagnostic tools in concert with a website, according to some embodiments.
Figure 8:
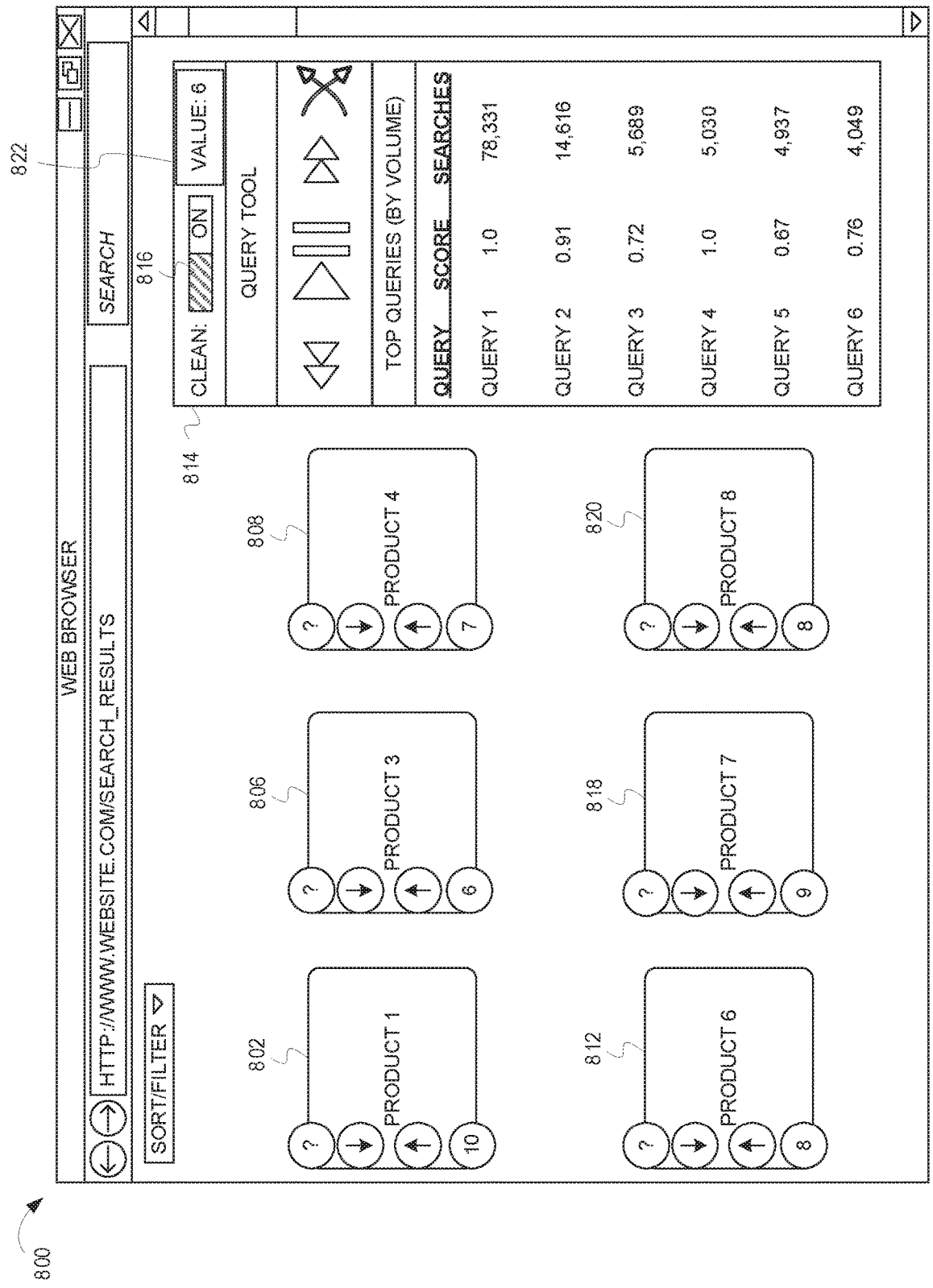
FIG. 8 depicts a webpage being presented via a web browser 800 after a filter tool 814 has been utilized, according to some embodiments.
Figure 9:
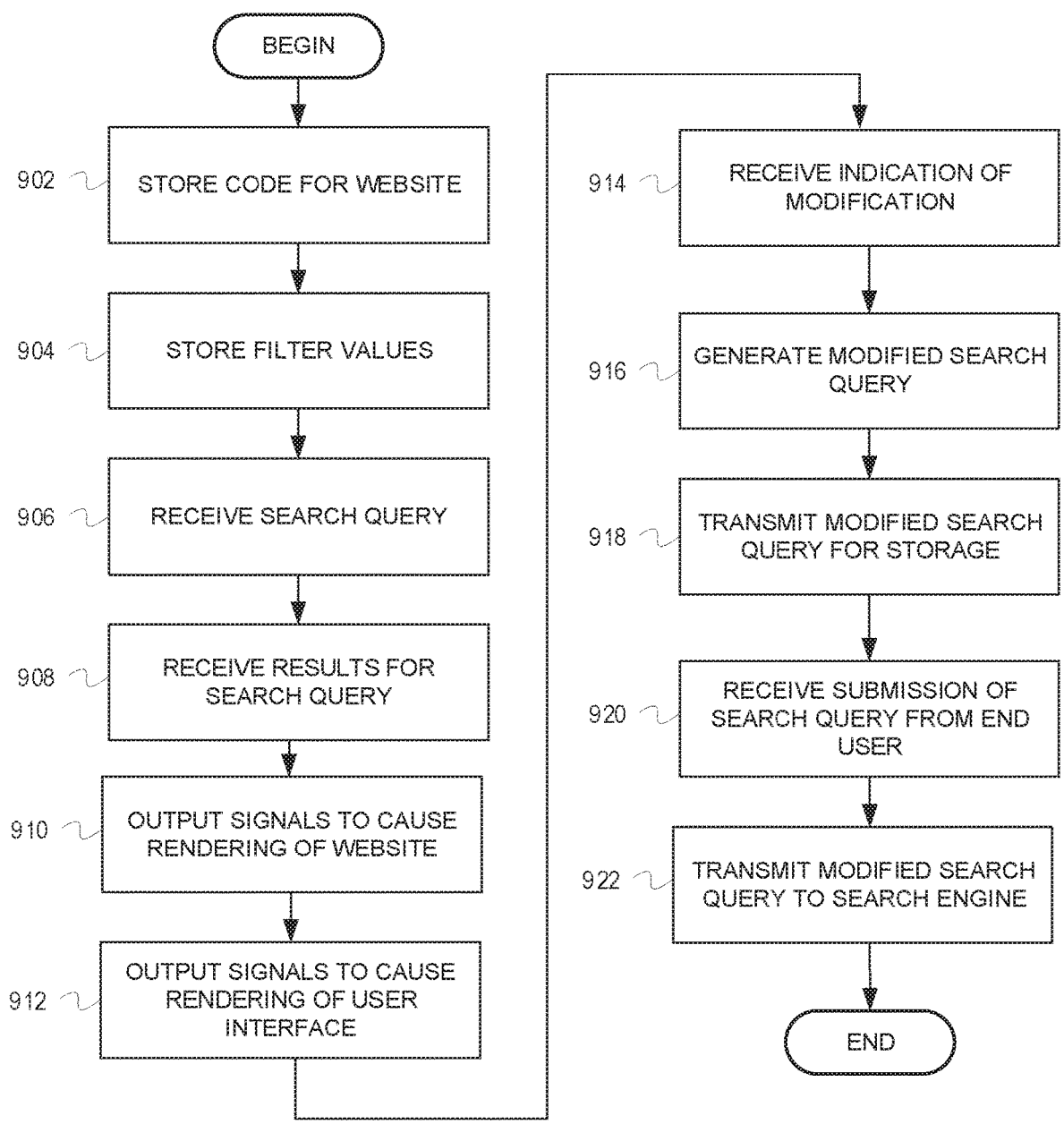
FIG. 9 is a flow chart including example operations for presenting search diagnostic tools in concert with a website, according to some embodiments.
Figure 10:
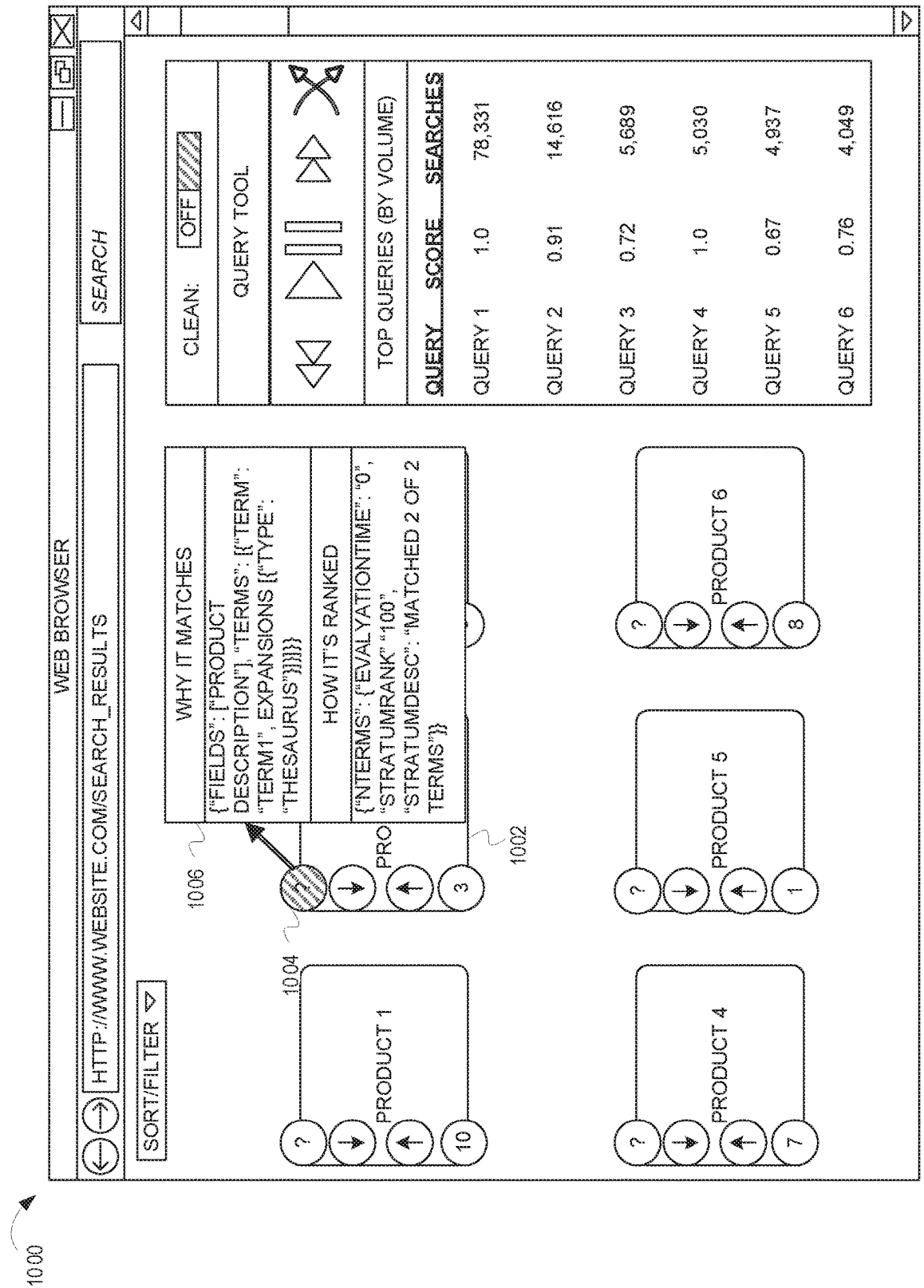
FIG. 10 depicts a webpage being presented via a web browser 1000 presenting an explain dialogue 1006, according to some embodiments.
Figure 11:
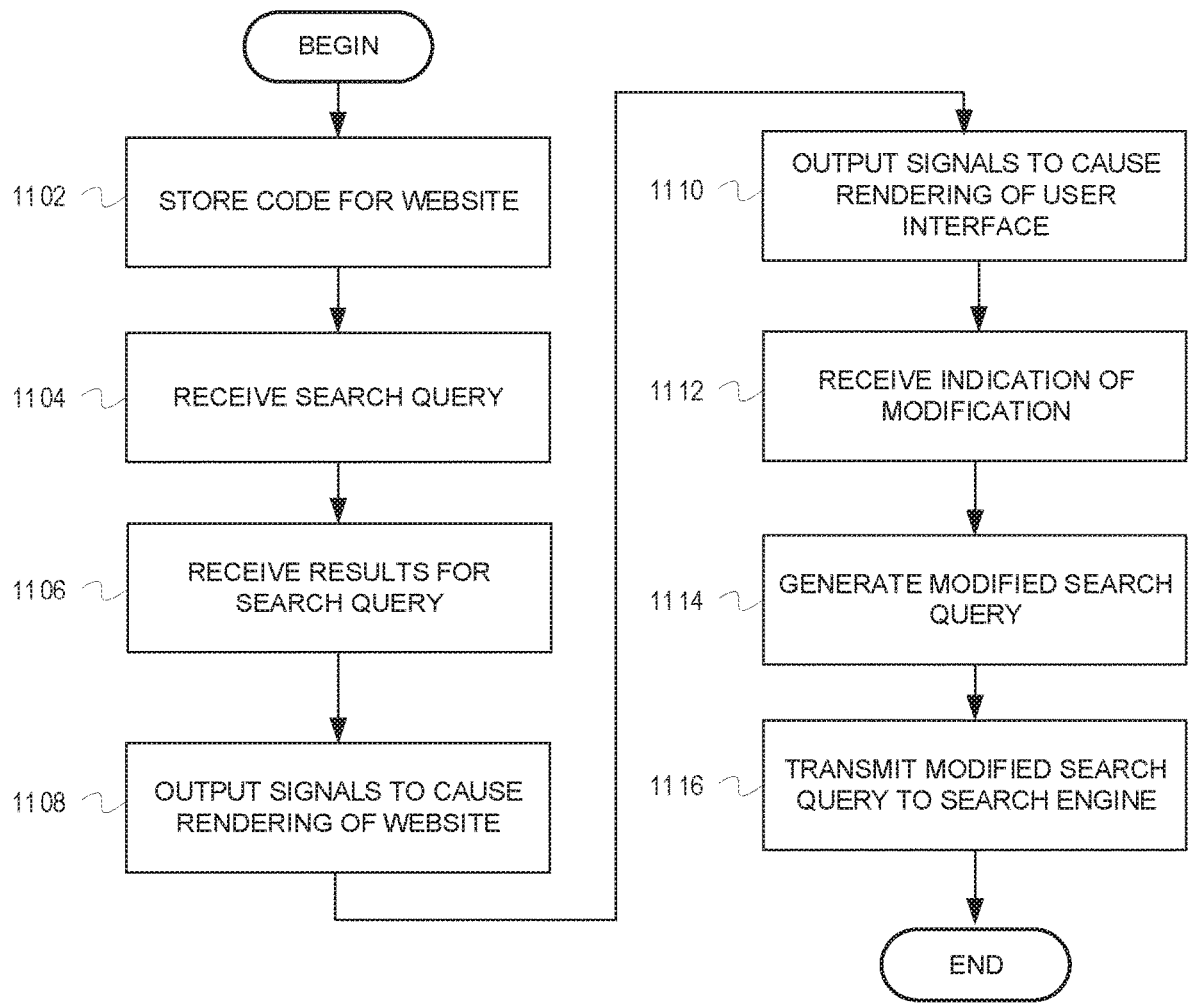
FIG. 11 is a flow chart including example operations for presenting search diagnostic tools in concert with a website, according to some embodiments.
Figure 12:
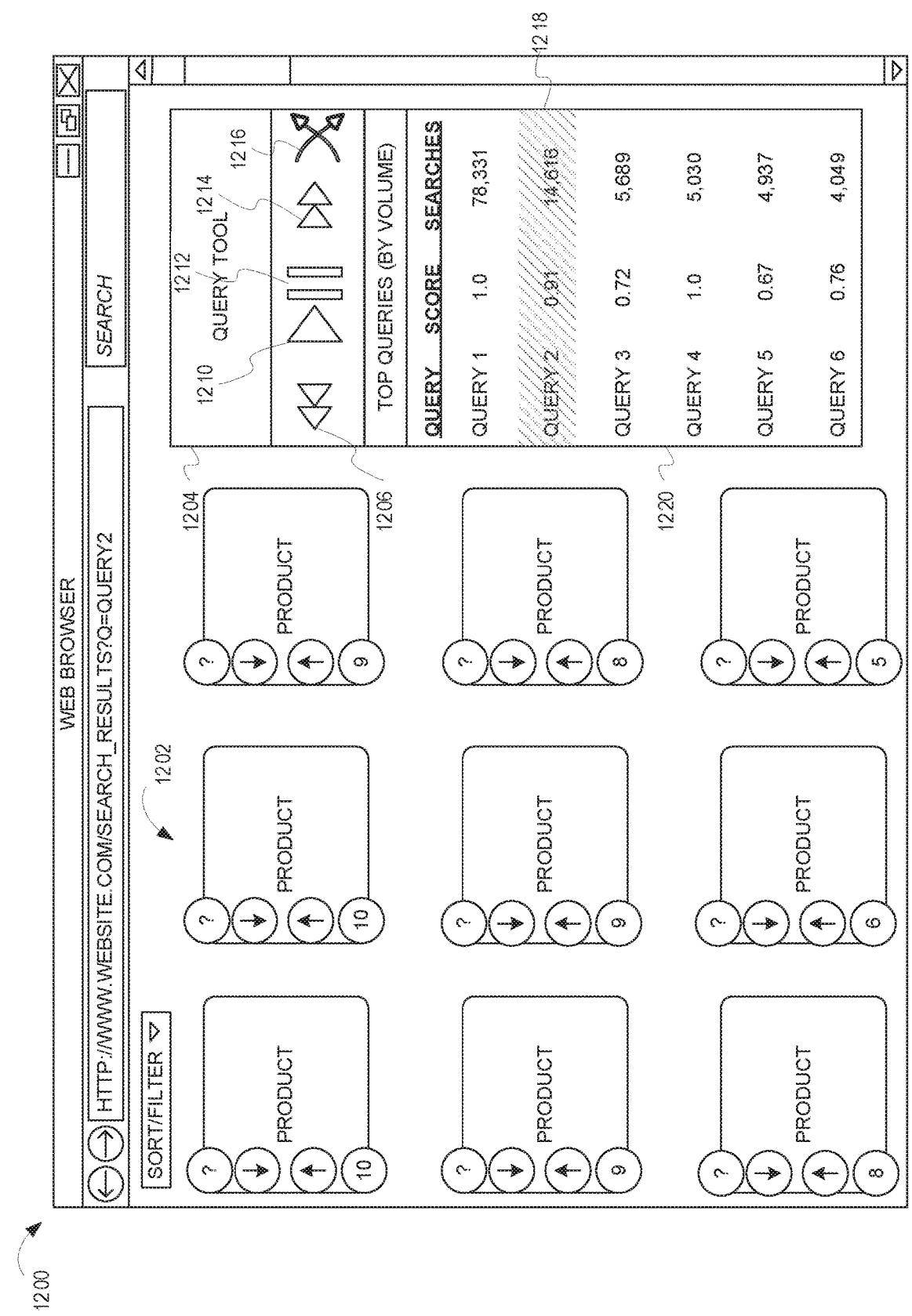
FIG. 12 depicts a webpage being presented via a web browser 1200 including a query tool 1204, according to some embodiments.
Figure 13:
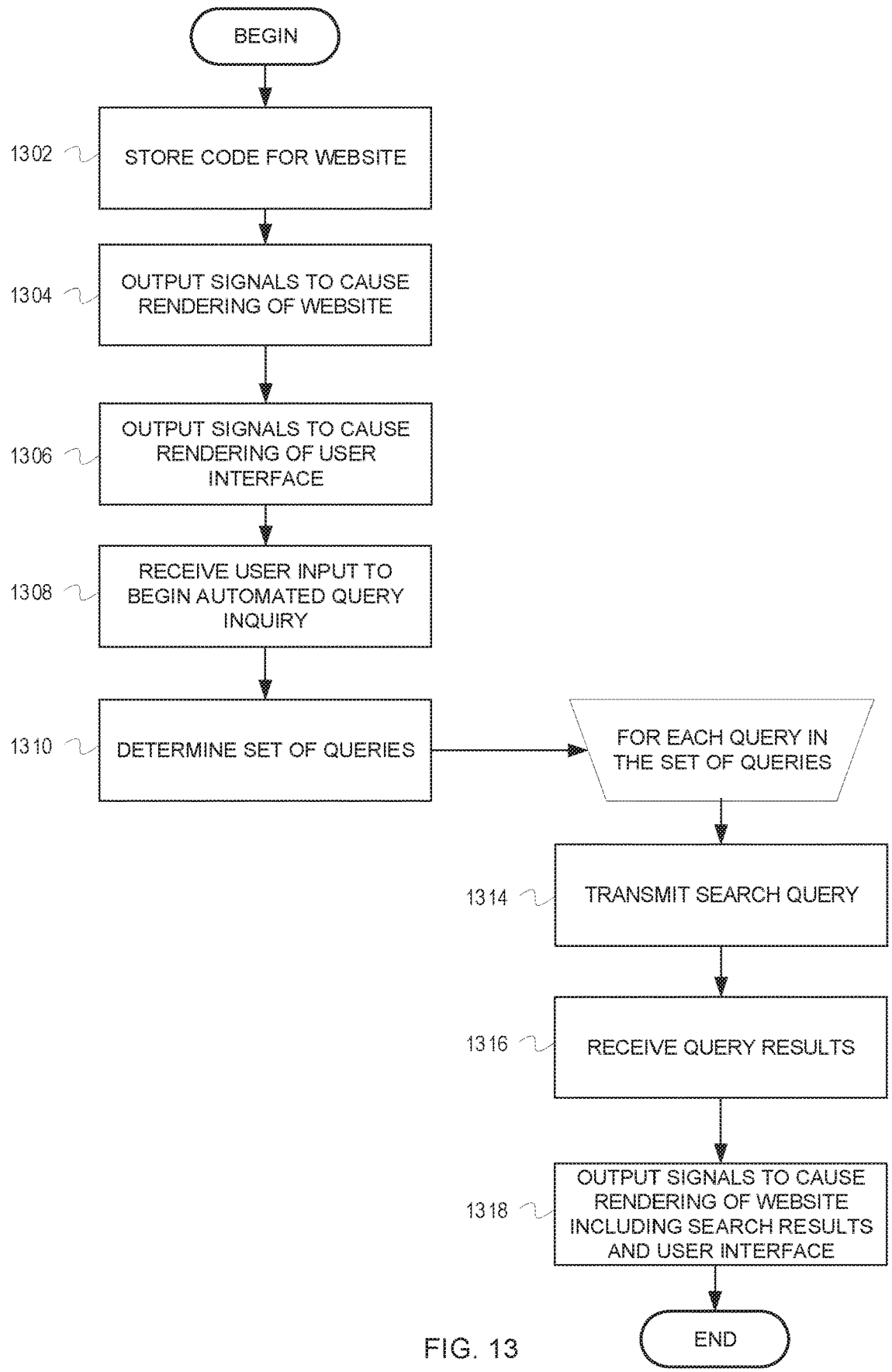
FIG. 13 is a flow chart depicting example operations for presenting search diagnostic tools in concert with a website, according to some embodiments.

The discussion of FIGS. 1-3 provides an overview of systems, methods, and apparatuses for presenting search diagnostic tools in concert with a website, the discussion of FIGS. 4-10 describes example ways that search results can be manipulated via the search diagnostic tools, the discussion of FIGS. 10-11 describes information that can be generated by the search diagnostic tools, and the discussion of FIGS. 12-13 describes an example automation that can be achieved via the search diagnostic tools.

Overview—Search Diagnostic Tools

FIG. 1 depicts a webpage being presented via web browser 100 in concert with search diagnostic tools 106, according to some embodiments. In the example depicted in FIG. 1, the website is for a retailer (e.g., a party selling goods and/or services online). While the example website provided in FIG. 1 is for a retailer, the systems, methods, and apparatuses described herein can be used with any type of website that includes a search function.

The website depicts a number of search results (i.e., products 104 in this example). The search results were generated based on a search query input by a user. For example, if the search query is "milk," the search results are products 104 fitting the description "milk" or associated with the search query "milk." In addition to the search results, the website includes a user interface integrated with the website (i.e., the user interface is presented in concert with the website). The user interface includes search diagnostic tools 106 (including a search query tool 108). The search diagnostic tools 106 allow a user to manipulate searches in an effort to alter the results of a search query. Specifically, in many instances, a user can modify a search query via the search diagnostic tools 106. As depicted in FIG. 1, at least some of the search diagnostic tools 106 are associated with ones of the search results. That is, when appropriate based on the functionality of a specific search diagnostic tool, each of the search results is presented with associated search diagnostic tools 106.

In some embodiments, the search diagnostic tools 106 are only presented to specific users. For example, a general user of the website (e.g., a customer) would see the search results but not the search diagnostic tools. In such embodiments, only authorized users would be presented with the search diagnostic tools 106. Such access control can be achieved by use of any suitable credentials (e.g., user names and passwords, use of virtual private networks (VPNs), network access controls, etc.). In one embodiment, a user is prompted for credentials upon receipt of a specific entry from the user (e.g. a predetermined pattern of keystrokes or "hotkeys"). Upon receipt of the specific entry from the user, the website presents an authorization prompt which, for example, allows the user to input his or her credentials.

As one example use case, an authorized user (e.g., an employee of the retailer), can review search results for search queries to identify search results that he or she feels do not fit well with the search queries. In such a use case, the employee can enter a search query (e.g., "bikes") and the website presents search results (i.e., products 104) that are returned based on the search query "bikes." The user can then select that the user interface be presented (e.g., by entering his or her credentials). The web browser 100 presents the user interface, including the search diagnostic tools 106, in concert with the website. The user can manipulate the search results via the search diagnostic tools. As one example, if one of the search results is a tricycle and the user feels that the tricycle would not be a useful search result for the query "bikes," the user can remove the tricycle from the search results. Once this action has been performed, when other users (e.g., customers) enter the search query "bikes," the tricycle will no longer be included in the search results. That is, the user has successfully manipulated the search functionality of the website, via the search diagnostic tools 106, to exclude the tricycle when other users (e.g., customers) search for bikes on the website. The user can manipulate the search without the need for any special training or knowledge. Ideally, any user that is able to use a web browser can utilize the search diagnostic tools to alter the results of a search. This is possible because the search engine itself need not be modified to accomplish the desired results.

While the discussion of FIG. 1 provides an overview of presenting search diagnostic tools in concert with a website, the discussion of FIG. 2 describes a system for presenting search diagnostic tools in concert with a website.

FIG. 2 is a block diagram of a system 200 for presenting search diagnostic tools in concert with a website, according to some embodiments. The system 200 includes a control circuit 202, a database 204, user device(s) 206, a key value store 210, a server 212, and a search engine 218. The control circuit 202, the database 204, the user device(s) 206, the key value store 210, the server 212, and the search engine 218 are communicatively coupled to at least some of the other components via a network 208. The network 208 can include multiple networks, such as intranets and internets (e.g., the Internet). That is, the network 208 is presented to indicate that the components depicted in FIG. 2 can communicate with one another, even though the network 208 may not be a single network, as depicted in FIG. 2. Additionally, although the control circuit 202, the database 204, the user device(s) 206, the key value store 210, the server 212, and the search engine 218 are depicted in FIG. 2, all of these components may not be required for all embodiments. For example, in some embodiments, the functionality of the database 204 and the key value store 210 may be merged into a single component, the key value store 210 may not be necessary, one or more of the components may be integrated into a single component, etc.

The server 212 stores code for a website. The server 212 can be a traditional web server that includes memory, processing capabilities, etc. and conforms to the HTTP protocol. In some embodiments, the server 212 can store multiple code sets. In the example depicted in FIG. 2, the server 212 stores two code sets: a first code set 214 and a second code set 216. Each of the two code sets includes executable code. The first code set 214 includes executable code for rendering the website including a search function for use with the website (e.g., to search for content within the website and/or contained within other websites). The second code set 216 includes executable code for rendering a user interface integrated with the rendering of the website. The user interface includes search diagnostic tool, as will be discussed in more detail below. Although FIG. 2 depicts the server 212 as storing only two code sets, embodiments are not so limited. As one example, the serve 212 could contain one code set including executable code for rendering the website and multiple other code sets for rendering different search diagnostic tools (e.g., each other code set could include executable code for rendering and/or allowing use of one or more search diagnostic tools). In such embodiments, the presentation of the search diagnostic tools can be controlled so that access to the search diagnostic tools is not binary (i.e., a user either does, or does not, have access to the search diagnostic tools). For example, different types of users may have access to different ones of the search diagnostic tools. A web browser renders the executable code based on the server 212 outputting code, data and/or instructions (e.g., json, XML, or other data interchange methods) instructing the web browser to present the user interface and the content.

The user device(s) 206 can be any device(s) suitable for presenting websites (e.g., desktop computers, laptop computers, tablets, smart phones, automotive infotainment systems, etc.). The user device(s) 206 can be used by general users (e.g., visitors of the website) to enter search queries and review search results. The user device(s) 206 can also be used by authorized users (i.e., users having permission or credentials required to view the user interface including the search diagnostic tools), such as employees associated with the website, contractors, or other third parties.

The control circuit 202 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. The control circuit 202 is configured (for example, by using corresponding programming as will be well understood by those skilled in the art) to carry out one or more of the steps, actions, and/or functions described herein.

By one optional approach the control circuit 202 operably couples to a memory. The memory may be integral to the control circuit 202 or can be physically discrete (in whole or in part) from the control circuit 202 as desired. This memory can also be local with respect to the control circuit 202 (where, for example, both share a common circuit board, chassis, power supply, and/or housing) or can be partially or wholly remote with respect to the control circuit 202 (where, for example, the memory is physically located in another facility, metropolitan area, or even country as compared to the control circuit 202).

This memory can serve, for example, to non-transitorily store the computer instructions that, when executed by the control circuit 202, cause the control circuit 202 to behave as described herein. As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM)) or random access memory (RAM). The control circuit 202 can include an hardware and/or software necessary to conduct the operations described herein.

Without implying any positional limitations, the control circuit 202 can be thought of as residing "between" the user device(s) 206 and the search engine 218. That is, although the control circuit 202 need not be physically located between the user device(s) 206 and the search engine 218, communications from the user device(s) 206 to the search engine 218 pass through the control circuit 202. For example, when a user submits a search query via a user device 206, the control circuit 202 receives the search query and passes the search query to the search engine 218.

When a user device 206 accesses the website, the server 212 serves the website to the user device 206. In some embodiments, the presentation of the website is dependent upon the user accessing the website. In one embodiment, a general user will only see the website (i.e., execution of the first code set 214). Further, only authorized users will see the website and the user interface (i.e., execution of the first code set 214 and the second code set 216). In this embodiment, the control circuit 202 will only output signals to cause rendering of the website based on execution of the first code set 214 for a general user and the control circuit 202 will output signals (e.g., via a markup language such as XML or json and/or code such JavaScript) to cause rendering of the website based on the first code set 214 and the user interface based on the second code set 216. In the aforementioned embodiment, the user's user device 206 does not control access to the first code set 214 and/or the second code set 216. In some instances, this embodiment may be preferential because the amount of data transferred to, and handled by, the user's user device 206 is limited and it may afford greater access control. In other embodiments, all user device(s) 206 will receive the signals to cause rendering of the first code set 214 and the second code set 216. However, the user's user device 206 will control whether the user interface is rendered based on whether the user is an authorized user. In some instances, these embodiments may be preferential as they may reduce computational overhead for the control circuit 202. In either of the above-noted embodiments, access to the user interface can be controlled using access controls. For example, a user device 206 may not present, or receive signals to cause rendering of, the user interface unless authorization information is received. For example, the authorization information can include a username and password, a network through which the user accesses the server, biometric information, or any other suitable information.

In some embodiments, utilization of one or more of the search diagnostic tools may cause modification of a search query (e.g., adding and/or deleting content from the search query). As previously noted, and discussed in more detail below, one of the search diagnostic tools may allow a user to "force" a search result to the top of the search results. In this example, utilization of such a search diagnostic tool would cause a query to be modified before it is passed to the search engine 218. For example, the search query "tire" results in $Product_1$ being returned by the search engine 218 and $Product_1$ being presented near the bottom of the search results. If an authorized user feels that $Product_1$ should be presented higher in the search results, he or she can "force" $Product_1$ further up in the search results, for example to the first position, the first row, an upper section, a predominate position, etc. This change to the search result (i.e., the forcing of $Product_1$ higher in the search results) is referred to as a modification to the search query. It is a modification to the search query because instead of altering the search engine 218 to cause this change to the search result, the search query is modified (e.g., changes, enhanced, amended, etc.) to cause $Product_1$ to be returned at a higher position by the search engine 218. For example, in layman's terms, the search query "tire" may be modified to read "tire+[place $Product_1$ in a higher position in the search results]." If the user saves this modification to the search query, when another user (whether general or authorized) enters the search query, the modified search query is passed to the search engine 218.

In some embodiments, search queries and modified search queries are stored in the key value store 210. At a high level, the key value store 210 can be thought of as a mapping between search queries and modified search queries. Continuing the example above, if the search query "tire" has been modified to read "tire+[place $Product_1$ in a higher position in the search results]," the key value store 210 can include a mapping between the search query "tire" and the modified search query "tire+[place $Product_1$ in a higher position in the search results]." Accordingly, when a user searches for the search query "tire," the control circuit 202 accesses the key value store 210, retrieves the modified search query associated with the search query "tire," and passes the modified search query (i.e., "tire+[place $Product_1$ in a higher position in the search results]") to the search engine 218. The search results returned by the search engine 218 are based on the modified search query.

In addition to the key value store 210, in some embodiments, the system 200 also includes the database 204. While the key value store 210 stores associations between the search queries and the modified search queries, the database 204 can store a more robust set of information regarding search queries and modified search queries (i.e., information related to the search queries and the modified search queries). For example, the database 204 can include previous modifications to search queries, indications of who made modifications to search queries, indications of when modifications to search queries were made, information regarding search results associated with search queries and modified search queries, analytics information regarding the search queries and/or modified search queries, etc. Additionally, in some embodiments, the database 204 can be multiple databases. Additionally, each of the multiple databases can be tasked with storing different types of information (e.g., a first database could store the previous modifications to the search queries, a second database could store indications of who made modifications to the search queries, etc.).

While the discussion of FIG. 2 describes a system for presenting search diagnostic tools in concert with a website, the discussion of FIG. 3 describes example operation for presenting search diagnostic tools in concert with a website.

FIG. 3 is a flow chart including example operations for presenting search diagnostic tools in concert with a website, according to some embodiments. The flow begins at block 302.

At block 302, code for a website is stored. For example, a server can store the code for the website. The code for the website includes multiple code sets. In one embodiment, the code for the website includes two code sets: a first code set and a second code set. The first code set includes executable code for rendering the website including a search function and the second code set includes executable code for rendering a user interface integrated with the rendering of the web site. The user interface includes search diagnostic tools. The flow continues at block 304.

At block 304, a search query is received. For example, a control circuit can receive the search query from a user. The search query is input by the user and seeks to find content on the website and/or on other websites related to the search query. The search query is passed to the search engine to generate search results. The flow continues at block 306.

At block 306, search results are received. For example, the search results are received by the control circuit from the search engine. The search results are based on the search query. The flow continues at block 308.

At block 308, signals are output based on the first code set. For example, the control circuit can output the signals based on the first code set. The signals based on the first code set cause rendering of the website by the user device. The rendering of the website includes the search results (i.e., the results of the search query). The flow continues at block 310.

At block 310, signals are output based on the second code set. For example, the control circuit can output the signals based on the second code set. The signals based on the second code set cause rendering of the user interface including the search diagnostic tools such that the user interface including the search diagnostic tools is presented with the results for the search query. For example, the search diagnostic tools can be presented next to, on top of, superimposed on, near, adjacent to, and/or in conjunction with the search results.

While the discussion of FIGS. 1-3 provides background information regarding systems, methods, and apparatuses for presenting search diagnostic tools in concert with a website, the discussion of FIGS. 4-13 provides examples of the functionality of some of the search diagnostic tools.

Example Search Diagnostic Tools

Figure 4:
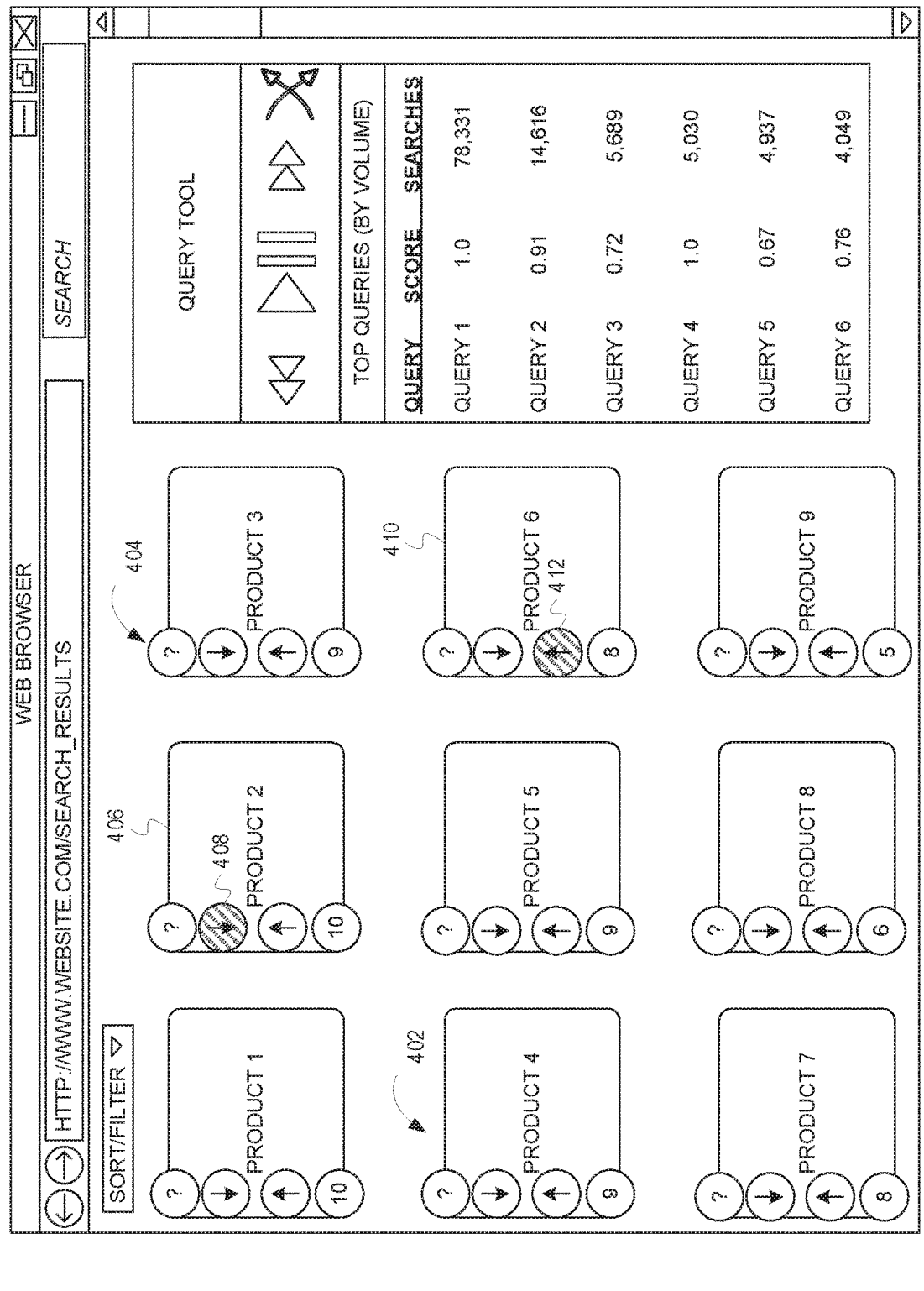
FIG. 4 depicts a webpage being presented via a web browser 400 before prioritization functionality has been utilized, according to some embodiments.
Figure 5:
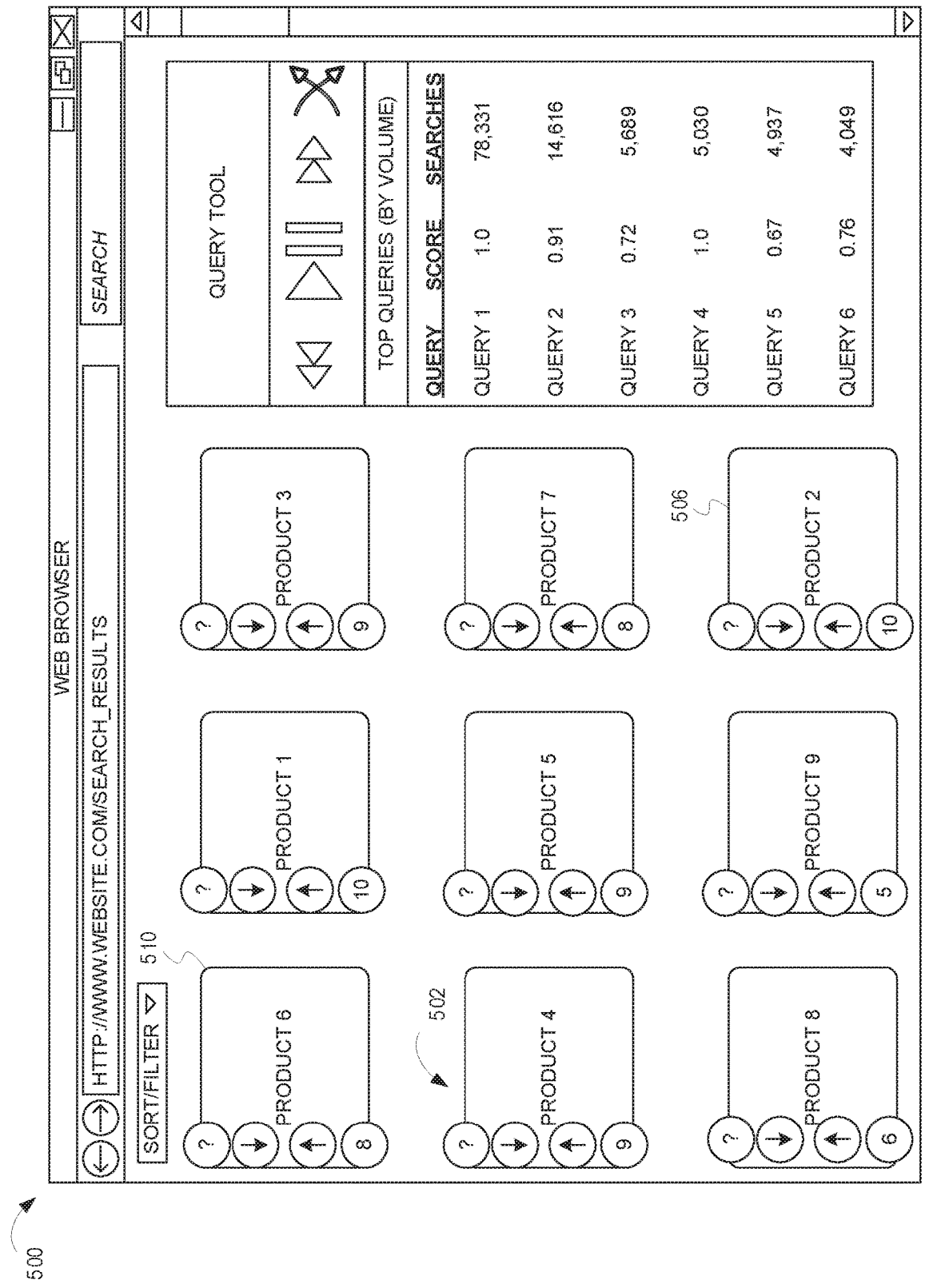
FIG. 5 depicts a webpage being presented via a web browser 500 after prioritization functionality has been utilized, according to some embodiments.

Prioritization Tools (Boost and Bury):

As previously discussed, the discussion of FIGS. 1-3 provides background information regarding systems, methods, and apparatuses for presenting search diagnostic tools in concert with a website. The discussion of FIGS. 4-6 describes a prioritization tool of the search diagnostic tools, according to some embodiments. FIG. 4 depicts a website presenting results for a search query before the prioritization tool is utilized and FIG. 5 depicts the website presenting results for the search query after the prioritization tool is utilized.

FIG. 4 depicts a webpage being presented via a web browser 400 before prioritization functionality has been utilized, according to some embodiments. The webpage is presenting search results based on a search query. In the example depicted in FIG. 4, the webpage is associated with a retailer's website and the search results are products 402 related to the search query. The presentation of the website includes search diagnostic tools 404. The search diagnostic tools 404 are presented in concert with the products 402.

The search diagnostic tools 404 important to this discussion are the prioritization tools. In the example depicted in FIG. 4, the search diagnostic tools 404 include two prioritization tools: a boost tool 412 and a bury tool 408. Although the discussed boost tool 412 and bury tool 408 are associated with the sixth product (i.e., Product 6) 410 and the second product (i.e., Product 2), respectively, it should be noted that each of the products 402 includes prioritization tools.

The prioritization tools allow a user, such as an authorized user, to alter the order in which the products 402 are presented in the search results. As depicted in FIG. 4, each of the products 402 is presented in order (i.e., Product 1 before Product 2, Product 2 before Product 3, Product 3 before Product 4, etc.). The order in which the products are ordered in FIG. 4 is a consequence of a search engine ranking based on the search query. Accordingly, the order in which the products 402 are presented in FIG. 4 is representative of the search result ordering before the user has performed a prioritization action.

When the user utilizes the prioritization tools, he or she indicates a modification to the search query. As depicted in FIG. 4, and indicated by the hashing, the user has selected the bury tool 408 for the second product (i.e., Product 2) 406 and the boost tool 412 for the sixth product (i.e., Product 6) 410. Selection of the bury tool 408 will cause the second product (i.e., Product 2) to be presented lower in the search results (e.g., at the bottom of the search results, at the bottom of a page of search results, etc.). Selection of the boost tool 412 will cause the sixth product (i.e., Product 6) 412 to be presented higher in the search results (e.g., at the top of the search results, in a higher page of search results, etc.). The consequence of these selections is depicted in FIG. 5.

Additionally, if the user selects the boost and/or bury tool again, it will "turn off" the boost and/or bury. For example, if the user selects the boost tool 412 for the sixth product (i.e., Product 6) 410, the sixth product (i.e., Product 6) 410 will no longer be boosted.

FIG. 5 depicts a webpage being presented via a web browser 500 after prioritization functionality has been utilized, according to some embodiments. That is, the web site presents the search results (i.e., products 502 related to the search query) in an order that differs from FIG. 4 because the user has utilized the prioritization tools.

As described above, the user has selected the bury tool for the second product (i.e., Product 2) 506 and the boost tool 412 for the sixth product (i.e., Product 6) 510. That is, the user has indicated a modification to the search query that will cause the second product (i.e., Product 2) 506 to be presented lower in the search results and the sixth product (i.e., Product 6) 510 to be presented higher in the search results. As depicted in FIG. 5, the sixth product (i.e., Product 6) 510 now occupies a higher position (i.e., in the top left of the search results) in the search results and the second product (i.e., Product 2) 506 now occupies a lower position in the search results (i.e., the bottom right position in the search results). Although FIG. 5 depicts the boosted result (i.e., the sixth product) being moved to a first position and the buried search result (i.e., the second product) moved to a last position, such is not required. For example, boosting a search result may move the search result to a higher position, but not necessarily the highest position and burying a search result may move the search result to a lower position but not necessarily the lowest position.

Use of the prioritization tools allows a user to alter the positioning of search results by modifying the search query. In some embodiments, because the search query is modified to alter the positioning of the search results, the search engine producing the search results does not need to be altered. Consequently, the average user (i.e., someone with knowledge of only how to navigate the Internet) may be able to accomplish such an alteration.

The search query can be modified in any suitable manner to achieve this result. In one example, the search query can be modified to include indications of the search results to be prioritized. Continuing the example described with respect to FIGS. 4 and 5, the search query can be modified to include indications of the second product (i.e., Product 2) 506 and the sixth product (i.e., Product 6) 510. The indication of the product can be a UPC, a SKU, or any other type of product identifier. Continuing the example, if the original unmodified search query is "[search query]," the modified search query may be "[search query]+[boost [UPC for the sixth product (i.e., Product 6) 510]]+[bury [UPC for the second product (i.e., Product 2) 506]]." This modified search query is passed to the search engine, resulting in the search results being presented via the website in an altered order. Put simply, after the user performs the prioritization modification, subsequent users of the website that enter the search query will see the search results in an order as altered by the user.

In addition to using the prioritization tools with regard to specific search results, in some embodiments, users can utilize the prioritization tools to alter the positioning of search results in bulk. In such embodiments, users may be able to prioritize search results based on any suitable grouping, such as by type, price, category, etc.

As previously discussed with respect to FIG. 2, a system for presenting search diagnostic tools in concert with a website can include a key value store. In embodiments in which such a system includes a key value store, when the user utilizes the prioritization tool to modify the search query, a mapping is created in the key value store that associates the search query with the modified search query.

Figure 6:
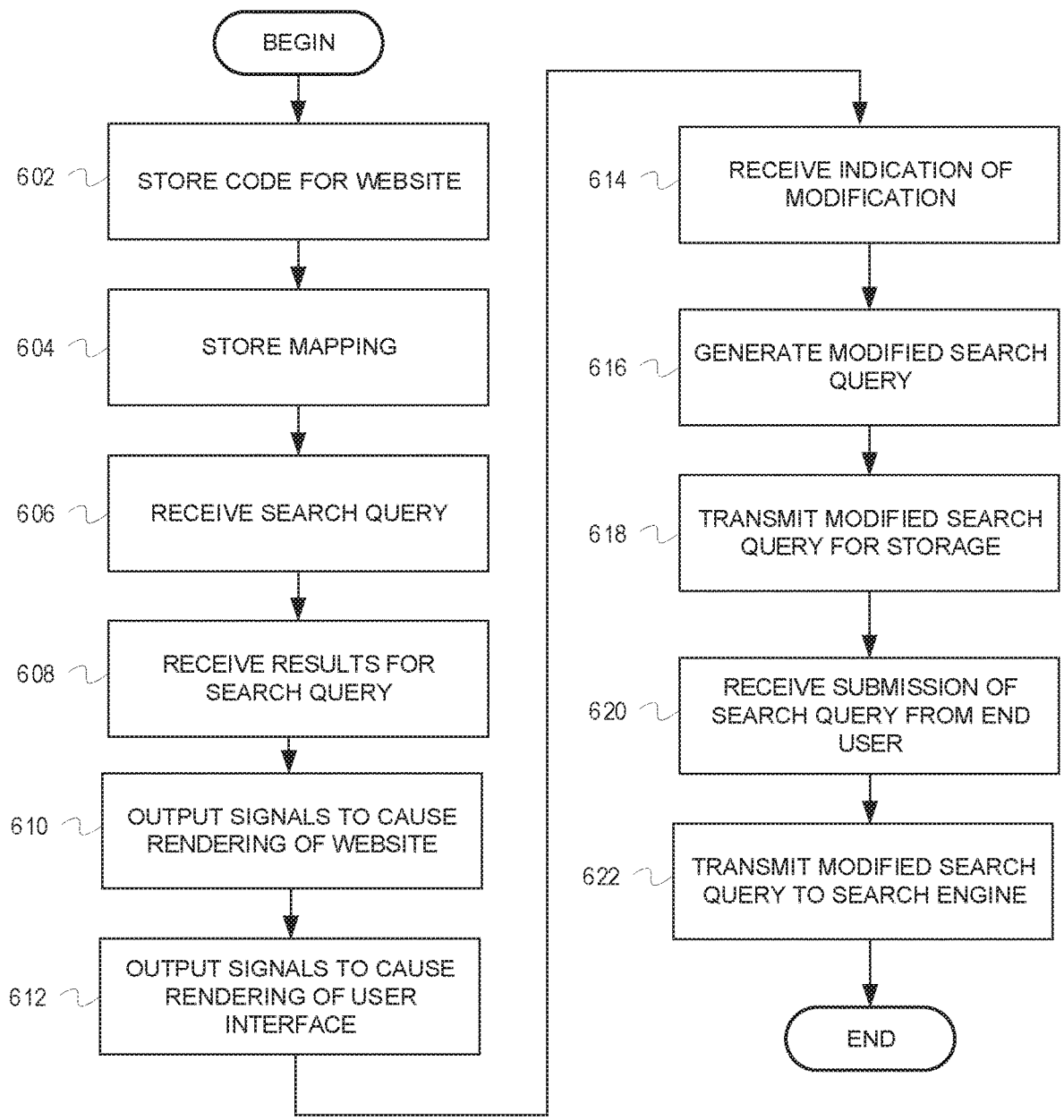
FIG. 6 is a flow chart including example operations for presenting search diagnostic tools in concert with a website, according to some embodiments.

While the discussion of FIGS. 4 and 5 describes a website presentation before and after the prioritization tools have been used, the discussion of FIG. 6 describes example operations performed by a system for presenting search diagnostic tools in concert with a website when the prioritization tools are used.

FIG. 6 is a flow chart including example operations for presenting search diagnostic tools in concert with a website, according to some embodiments. The flow begins at block 602.

At block 602, code for a website is stored. For example, a server can store the code for the website. The code for the website includes multiple code sets. In one embodiment, the code for the website includes two code sets: a first code set and a second code set. The first code set includes executable code for rendering the website including a search function and the second code set includes executable code for rendering a user interface integrated with the rendering of the web site. The user interface includes search diagnostic tools. The flow continues at block 604.

At block 604, a mapping is stored. For example, a key value store can store the mapping. The mappings are associations between search queries and modified search queries. For example, a user (e.g., a person associated with a website offering a search function) may feel that the search results returned for a search query are different than what he or she would like. As will be discussed in detail below with respect to prioritization tools, the user can alter the way the search results are presented via the website. When the user does so, he or she indicates a modification to the search query. The result is a modified search query. The modified search query is based on the original (i.e., unmodified) search query. The key value store stores a mapping between the original (i.e., unmodified) and modified search query. A single value may be a composition of many modifications to the query. The flow continues at block 606.

At block 606, a search query is received. For example, a control circuit can receive the search query from a user. The search query is input by the user and seeks to find content on the website and/or on other websites related to the search query. The search query is passed to the search engine to generate search results. The flow continues at block 608.

At block 608, search results are received. For example, the search results are received by the control circuit from the search engine. The search results are based on the search query. The flow continues at block 610.

At block 610, signals are output based on the first code set. For example, the control circuit can output the signals based on the first code set. The signals based on the first code set cause rendering of the website by the user device. The rendering of the website includes the search results (i.e., the results of the search query). The flow continues at block 612.

At block 612, signals are output based on the second code set. For example, the control circuit can output the signals based on the second code set. The signals based on the second code set cause rendering of the user interface including the search diagnostic tools such that the user interface including the search diagnostic tools is presented with the results for the search query. For example, the search diagnostic tools can be presented next to, on top of, superimposed on, near, adjacent to, and/or in conjunction with the search results. The search diagnostic tools include prioritization tools configured to control prioritization of the results for the search query. The flow continues at block 614.

At block 614, an indication of a modification to the search query is received. For example, the control circuit can receive the indication of the modification to the search query. The indication of the modification to the search query is based on utilization of the prioritization tools. For example, the modification to the search query can be the boosting of a search result or the burying of a search result. The flow continues at block 616.

At block 616, a modified search query is generated. For example, the control circuit can generate the modified search query. The modified search query is based on the search query and the indication of the modification of the search query. The search query can be modified in any manner suitable to obtain the desired prioritization. For example, an indication of the search result, and indication of a group of search results, an indication of a category of search results, an indication of a priority for the search result, etc. can be incorporated into the search query to generate the modified search query. The flow continues at block 618.

At block 618, the modified search query is transmitted for storage. For example, the control circuit can transmit the modified search query to a key value store for storage. Additionally, in some embodiments, the control circuit can transmit the modified search query to a database (e.g., a SQL or NoSQL database) for storage. In such embodiments, additional information regarding the search query and the modified search query can be stored in the database. The flow continues at block 620.

At block 620, submission of the search query is received from an end user. For example, the control circuit can receive the submission of the search query from a user of the website, such as a general user or an authorized user for testing and/or evaluation. The flow continues at block 622.

At block 622, the modified search query is transmitted to the search engine. For example, the control circuit can transmit the modified search query to the search engine. This step assumes that a modification has been performed to the search query submitted. For example, if a modified search query was previously generated for the specific search query that was submitted, instead of submitting the search query to the search engine, the modified search query is submitted. In some embodiments, the control circuit accesses the key value store to retrieve the modified search query associated with the search query. In such embodiments, the control circuit submits the modified search query retrieved based on this access.

Figure 7:
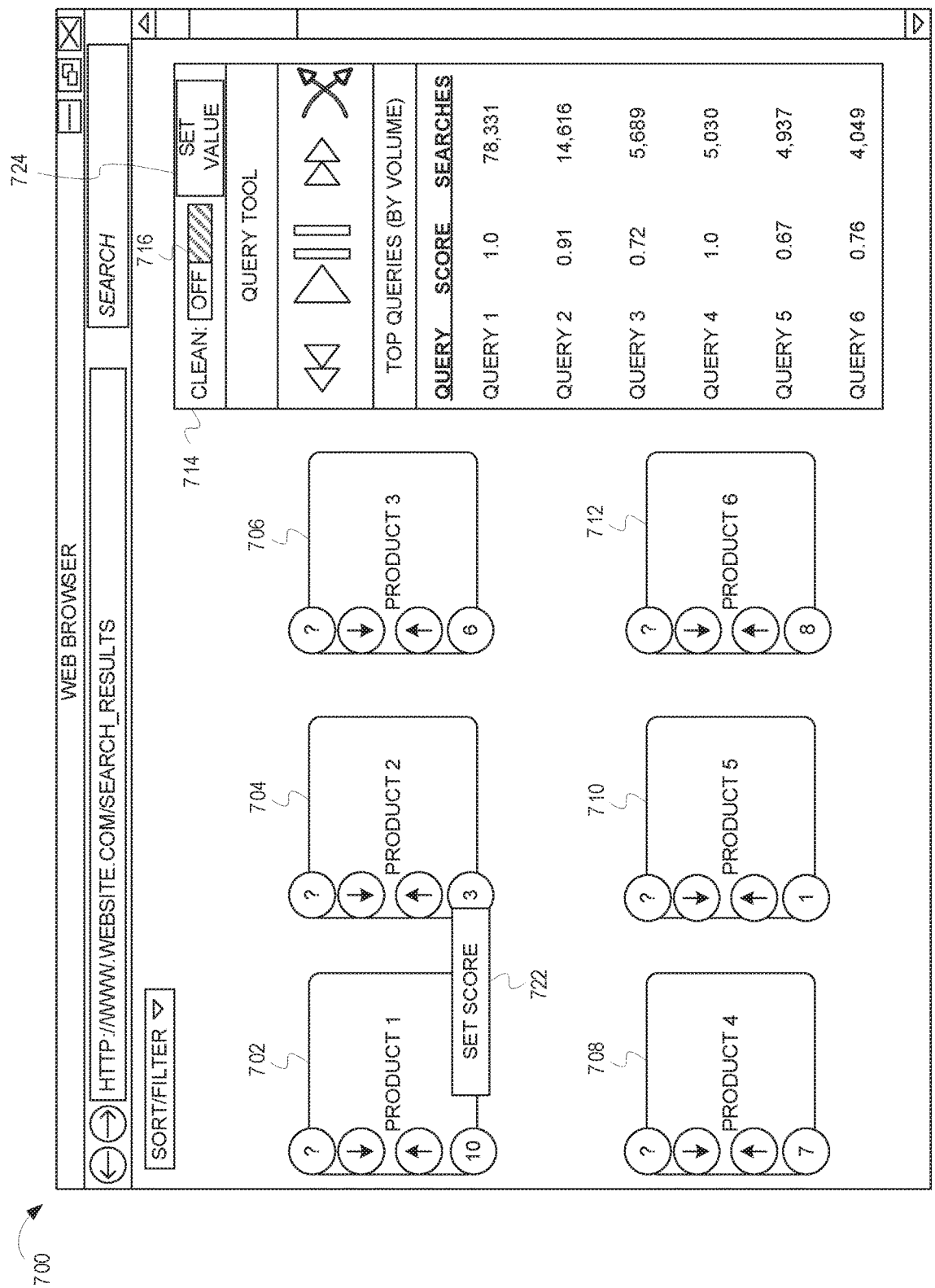
FIG. 7 depicts a webpage being presented via a web browser 700 before a filter tool 714 has been utilized, according to some embodiments.

While the discussion of FIGS. 4-6 describes a prioritization tool of the search diagnostic tools, the discussion of FIGS. 7-9 describes a filter tool of the search diagnostic tools.

Filter Tools (Auto Clean):

The discussion of FIGS. 7-9 describes a filter tool of the search diagnostic tools. Generally, the filter tool allows users to quickly and easily alter the results of a search based on scores associated with each of the search results and, in some embodiments, the search query. FIG. 7 depicts a website presenting results for a search query before the filter tool is utilized and FIG. 8 depicts the website presenting results for the search query after the filter tool has been utilized.

FIG. 7 depicts a webpage being presented via a web browser 700 before a filter tool 714 has been utilized, according to some embodiments. The filter tool 714 is a quick way for a user to "clean" (i.e., remove low-scoring search results) without having to manually prioritize (e.g., "deprioritize") each low-scoring search result. As depicted in FIG. 7, the filter tool 714 is set to an off position 716.

Because the filter tool 714 is set to the off position 716, the website is presenting the search results received from the search engine without any filtering. Additionally, in some embodiments, the filter tool 714 allows the user to set a filter value via a set value selection 724. The filter value is the value below which products will be excluded from the search results, as discussed in more detail below. In some embodiments, the filter value can be preset for example, to no value (no filtering), zero, five, or any other desired value.

The example website used for FIG. 7 is a retail website and the search results are products. As depicted in FIG. 7, the search engine has returned six search results based on a search query: a first product (i.e., Product 1) 702, a second product (i.e., Product 2) 704, a third product (i.e., Product 3) 706, a fourth product (i.e., Product 4) 708, a fifth product (i.e., Product 5) 710, and a sixth product (i.e., Product 6) 712. Each of the products has a score indicating the product's relevance to the search query, such as an NDCG score, a Precision at K score, an MRR score, etc. As depicted in FIG. 7, the first product (i.e., Product 1) 702 has a score of ten, the second product (i.e., Product 2) 704 has a score of three, the third product (i.e., Product 3) 706 has a score of six, the fourth product (i.e., Product 4) 708 has a score of seven, the fifth product (i.e., Product 5) 710 has a score of one, and the sixth product (i.e., Product 6) 712 has a score of eight.

Instead of using the prioritization tools (as described with respect to FIGS. 4-6) to increase the priority of high-scoring product and/or decrease the priority of low-scoring products, the user utilizes the filter tool 714 to alter the results for the search query. In some embodiments, the user can indicate a filter value to be used by the filter tool 714. For example, the user can choose to have all results having a score below a specified value removed from the search results. In the example depicted between FIGS. 7 and 8, the user has selected a filtering value of six (i.e., all search results having a score below six will be removed from the search results). That is, the second product (i.e., Product 2) 704 and the fifth product (i.e., Product 5) 710 will be removed from the search results because both the second product (i.e., Product 2) 704 and the fifth product (i.e., Product 5) 710 have scores below six (i.e., scores of three and one, respectively). FIG. 8 depicts the consequence of utilizing the filter tool 714 with a filter value of six.

In some embodiments, the search diagnostic tools include a scoring tool 722. The scoring tool 722 allows the user to set the score for the product. For example, as depicted in FIG. 7, the scoring tool 722 is associated with the second product (i.e., Product 2) 704. Selection of the scoring tool 722 allows the user to set, alter, change, or otherwise adjust the score for the product for which the scoring tool 722 is associated. Although FIG. 7 depicts the scoring tool 722 as associated only with the second product (i.e., Product 2) 704, in some embodiments, each search result can have a scoring tool, similar to the scoring tool 722. For example, selection of the score for a product may cause presentation of a scoring tool associated with the selected score for the product. In some embodiments, the score for a product is associated with the search query. That is, if the search query is "$Query_1$" and the user sets the score for the second product (i.e., Product 2) 704 to ten, the second product (i.e., Product 2) 704 will only have a score of ten for the search query "$Query_1$." If a subsequent user searches with the search query "$Query_2$," the second product (i.e., Product 2) 704 may not have a score of ten for the search query "$Query_2$."

FIG. 8 depicts a webpage being presented via a web browser 800 after a filter tool 814 has been utilized, according to some embodiments. As depicted in FIG. 8, the filter tool 814 is set to an on position 816 and the filter value has been set to six via a set value selection 822. The user can change the filter value, and thus the filtering of the search results, via the set value selection 822. When set to the on position 816, the filter tool 814 removes all search results below the specified value. As previously discussed with respect to FIG. 7, the second product (i.e., Product 2) 704 and the fifth product (i.e., Product 5) 710 had scores below the specified value (i.e., six). Consequently, neither the second product (i.e., Product 2) 704 nor the fifth product (i.e., Product 5) 710 are included in the search results depicted in FIG. 8. Instead, these search results have been replaced with new products (i.e., a seventh product (i.e., Product 7) 818 and an eight product (i.e., Product 8) 820) both having scores above six. The seventh product (i.e., Product 7) 818 and the eighth product (i.e., Product 8) 820 have scores of eight and nine, respectively. In one embodiment, the search results are "replaced with new products" by removing the old products (i.e., the second product (i.e., Product 2) 704 and the fifth product (i.e., Product 5) 710), which causes other products returned for the search query to move further up in the list. For example, as depicted in FIG. 8, the second product (i.e., Product 2) 704 and the fifth product (i.e., Product 5) 710 no longer appear in the search results and two new products (i.e., the seventh product (i.e., Product 7) 818 and the eighth product (i.e., Product 8) 820) have been moved up in the search results and now appear on the first page of the search results.

Although the example provided in FIG. 8 depicts new search results replacing the removed search results, such is not required. That is, when the second product (i.e., Product 2) 704 and the fifth product (i.e., Product 5) 710 were removed, they may not be replaced with any other products, leaving only the first product (i.e., Product 1) 702, the third product (i.e., Product 3) 706, the fourth product (i.e., Product 4) 708, and the sixth product (i.e., Product 6) 712 from FIG. 7. Additionally, in some embodiments, the new products (i.e., the seventh product (i.e., Product 7) 818 and the eighth product (i.e., Product 8) 820) may not be "new" in the sense that these two new products weren't included in the search results previously. Rather, these new products may have been included in the original search results, but ordered in such a manner that the two new products did not appear on the website as presented in FIG. 7 (e.g., the user may have had to scroll down further to see these two new products).

Additionally, though not depicted in FIG. 8, in some embodiments, the filter tool 814 may alter the prioritization of the search results in addition to the removal of search results having scores below the specific value. For example, utilization of the filter tool 814 may cause the search results to be presented via the website in a descending order based on score. In such a case, assuming a priority ordering of left-to-right and top-to-bottom, the website would present the search results in the following order: the first product (i.e., Product 1) 802, the eighth product (i.e., Product 8) 820, the seventh product (i.e., Product 7) 818, the sixth product (i.e., Product 6) 812, the fourth product (i.e., Product 4) 808, and the third product (i.e., Product 3) 806.

When the filter tool 814 is utilized, it causes a modified search query to be generated. The modified search query is based on the search query (i.e., the original search query) and includes an indication of the filtering. In one embodiment, the modified search query includes indications of products to be excluded from the search results. Returning to FIG. 7 and the example filtering of products having scores below six, the modified search query would include an indication of second product (i.e., Product 2) 704 and the fifth product (i.e., Product 5) 710. The indication of the products can be any indication suitable for identifying the products. Continuing the example provided above, if the original unmodified search query is "[search query]," the modified search query may be "[search query]+[exclude [UPC for the second product (i.e., Product 2) 704]]+[exclude [UPC for the fifth product (i.e., Product 5) 710]]."

As previously discussed with respect to FIG. 2, a system for presenting search diagnostic tools in concert with a website can include a key value store. In embodiments in which such a system includes a key value store, when the user utilizes the filter tool to modify the search query, a mapping is created in the key value store that associates the search query with the modified search query.

While the discussion of FIGS. 7 and 8 describes a website presentation before and after the filter tool has been used, the discussion of FIG. 9 describes example operations performed by a system for presenting search diagnostic tools in concert with a website when the filter tool is used.

FIG. 9 is a flow chart including example operations for presenting search diagnostic tools in concert with a website, according to some embodiments. The flow begins at block 902.

At block 902, code for a website is stored. For example, a server can store the code for the website. The code for the website includes multiple code sets. In one embodiment, the code for the website includes two code sets: a first code set and a second code set. The first code set includes executable code for rendering the website including a search function and the second code set includes executable code for rendering a user interface integrated with the rendering of the website. The user interface includes search diagnostic tools. The flow continues at block 904.

At block 904, filter values are stored. For example, a key value store or database can store the filter values. The filter values are associated with search queries. For example, if a user (e.g., an authorized user) has turned on a filter tool for a specific search query, a filter value for that specific search query is stored in the database. In some embodiments, the filter value can be set by the user. That is, the user can set whatever value he or she would like to use to filter the search results. In some embodiments, the key value store can store mappings between search queries and modified search queries. For example, the user may feel that the search results returned for a search query are different than what he or she would like. As will be discussed in detail below with respect to a filter tool, the user can alter the way the search results are presented on the website. When the user does so, he or she indicates a modification to the search query. The result is a modified search query. The modified search query is based on the original (i.e., unmodified) search query. The key value store stores a mapping between the original (i.e., unmodified) and modified search query. The flow continues at block 906.

At block 906, a search query is received. For example, a control circuit can receive the search query from a user. The search query is input by the user and seeks to find content on the website and/or on other websites related to the search query. The search query is passed to the search engine to generate search results. The flow continues at block 908.

At block 908, search results are received. For example, the search results are received by the control circuit from the search engine. The search results are based on the search query. The flow continues at block 910.

At block 910, signals are output based on the first code set. For example, the control circuit can output the signals based on the first code set. The signals based on the first code set cause rendering of the website by the user device. The rendering of the website includes the search results (i.e., the results of the search query). The flow continues at block 912.

At block 912, signals are output based on the second code set. For example, the control circuit can output the signals based on the second code set. The signals based on the second code set cause rendering of the user interface including the search diagnostic tools such that the user interface including the search diagnostic tools is presented with the results for the search query. For example, the search diagnostic tools can be presented next to, on top of, superimposed on, near, adjacent to, and/or in conjunction with the search results. The search diagnostic tools include a filter tool configured to control filtering of the results for the search query. The flow continues at block 914.

At block 914, an indication of a modification to the search query is received. For example, the control circuit can receive the indication of the modification to the search query. The indication of the modification to the search query is based on utilization of the filter tool. For example, the modification to the search query can be the filtering of search results below a value and/or indicate items to be excluded from the search results. The flow continues at block 916.

At block 916, a modified search query is generated. For example, the control circuit can generate the modified search query. The modified search query is based on the search query and the indication of the modification of the search query. The search query can be modified in any manner suitable to obtain the desired filtering. For example, an indication of search results to exclude and/or the filter value can be incorporated into the search query to generate the modified search query. The flow continues at block 918.

At block 918, the modified search query is transmitted for storage. For example, the control circuit can transmit the modified search query to the key value store for storage. Additionally, in some embodiments, the control circuit can transmit the modified search query to a database (e.g., a SQL or NoSQL database) for storage. In such embodiments, additional information regarding the search query and the modified search query can be stored in the database. The flow continues at block 920.

At block 920, submission of the search query is received from an end user. For example, the control circuit can receive the submission of the search query from a user of the website, such as a general user or an authorized user for testing and/or evaluation. The flow continues at block 922.

At block 922, the modified search query is transmitted to the search engine. For example, the control circuit can transmit the modified search query to the search engine. This step assumes that a modification has been performed to the search query submitted. For example, if a modified search query was previously generated for the specific search query that was submitted, instead of submitting the search query to the search engine, the modified search query is submitted. In some embodiments, the control circuit accesses the key value store to retrieve the modified search query associated with the search query. In such embodiments, the control circuit submits the modified search query retrieved based on this access.

While the discussion of FIGS. 7-9 describes use of a filter tool of the search diagnostic tools, the discussion of FIGS. 10-11 describes use of an explanation tool of the search diagnostic tools.

Explanation Tool (Explain):

FIG. 10 depicts a webpage being presented via a web browser 1000 presenting an explain dialogue 1006, according to some embodiments. In some embodiments, the search diagnostic tools include an explanation tool 1004. Although the explanation tool 1004 is associated with a second product (i.e., Product 2) 1002, each search result depicted in FIG. 10 includes an explanation tool. When the explanation tool 1004 is selected (as indicated by the hashing), the explain dialogue 1006 is presented. The explain dialogue 1006 includes explanations relating to rendered search results. Accordingly, the explain dialogue 1006 can include any information relevant to why a specific search result was returned by the search engine. As one example, the explain dialogue 1006 includes information relating to why a search result was returned (i.e., why the product matched the search query) and how a search result is ranked (i.e., how the product ranks based on the search query). The information relating to why a search result was returned can be based on terms in the search query that match terms found in the search result title, description, etc., thesaurus expansions of terms, categorical information, etc. The information relating to how a search result is ranked can be based on a number of terms matched, a number of categories matched, the similarity between the search query and the product, etc.

Although FIG. 10 depicts only a single explanation dialogue 1006, embodiments are not so limited. For example, in some embodiments, multiple explanation dialogues can be presented simultaneously, for one or multiple products. Additionally, as a further example, in some embodiments, the explanation tool 1004 can be global. That is, the search diagnostic tools can include one or more explanation tools 1004 that cause explanation dialogues to be presented for all search results (e.g., all search results currently presented via the website). In such embodiments, when the user scrolls through the search results, new explanation dialogues can be presented as new search results are presented.

Upon selection of the explanation tool 1004, a modified search query is generated. The modified search query includes a request for explanation. The request for explanation requests at least the information used to generate the explanation dialogue 1006. Continuing the example described above, if the search query is "search query," the modified search query may be "search query+[explanation for [the second product (i.e., Product 2) 1002]]" or "search query+[add explanations]+[add ranking information]." The modified search query is sent to the search engine.

In some embodiments, the explanation tool 1004 is available to all users. For example, in such embodiments, no authorization information is required to access the explanation tool 1004. When the explanation tool 1004 is available to all users, general users of the website (e.g., shoppers) can gain a better understanding of why a search result was returned for a specific search query. In such embodiments, the code set that includes the explanation tool 1004 may be separate from others of the search diagnostic tools. In some embodiments, the explanation tool 1004 is available to all users because it does not modify search queries for subsequent users (i.e., it can be thought of as "read only").

While the discussion of FIG. 10 provides background information regarding an explanation tool of the search diagnostic tools, the discussion of FIG. 11 describes example operations performed by a system for presenting search diagnostic tools in concert with a website when the explanation tool is used.

FIG. 11 is a flow chart including example operations for presenting search diagnostic tools in concert with a website, according to some embodiments. The flow begins at block 1102.

At block 1102, code for a website is stored. For example, a server can store the code for the website. The code for the website includes multiple code sets. In one embodiment, the code for the website includes two code sets: a first code set and a second code set. The first code set includes executable code for rendering the website including a search function and the second code set includes executable code for rendering a user interface integrated with the rendering of the website. The user interface includes search diagnostic tools. The flow continues at block 11004.

At block 1104, a search query is received. For example, a control circuit can receive the search query from a user. The search query is input by the user and seeks to find content on the website and/or on other websites related to the search query. The search query is passed to the search engine to generate search results. The flow continues at block 1106.

At block 1106, search results are received. For example, the search results are received by the control circuit from the search engine. The search results are based on the search query. The flow continues at block 1108.

At block 1108, signals are output based on the first code set. For example, the control circuit can output the signals based on the first code set. The signals based on the first code set cause rendering of the website by the user device. The rendering of the website includes the search results (i.e., the results of the search query). The flow continues at block 1110.

At block 1110, signals are output based on the second code set. For example, the control circuit can output the signals based on the second code set. The signals based on the second code set cause rendering of the user interface including the search diagnostic tools such that the user interface including the search diagnostic tools is presented with the results for the search query. For example, the search diagnostic tools can be presented next to, on top of, superimposed on, near, adjacent to, and/or in conjunction with the search results. The search diagnostic tools include an explanation tool configured to receive diagnostic requests for explanations relating to rendered search results. As previously discussed, the explanation tool may be accessible to users that do not have authorization information. In such embodiments, at least some of the search diagnostic tools may be included in a third code set. The flow continues at block 1112.

At block 1112, an indication of a modification to the search query is received. For example, the control circuit can receive the indication of the modification to the search query. The indication of the modification to the search query is based on utilization of the explanation tool. For example, the modification to the search query can be a request for explanations relating to rendered search results. The flow continues at block 1114.

At block 1114, a modified search query is generated. For example, the control circuit can generate the modified search query. The modified search query is based on the search query and the indication of the modification of the search query. The search query can be modified in any manner suitable to obtain the desired explanation. For example, request for an explanation as to why one or more search results were included can be incorporated into the search query to generate the modified search query. The flow continues at block 1116.

At block 1116, the modified search query is transmitted to the search engine. For example, the control circuit can transmit the modified search query to the search engine. That is, once the modified search query is generated, the modified search query is transmitted to the search engine. The search engine returns the information relating to why one or more search results were included. The information relating to why one or more search results were included can include an NDCG score, a list of matching terms, a ranking, a summary, a list of matching products, a list of matching records, a summary for textual matching of terms to records across various fields a record's data, a summary of a ranking of a record among others who match similarly, spell corrections, synonym expansions, and stemming.

While the discussion of FIGS. 10-11 describes use of an explanation tool of the search diagnostic tools, the discussion of FIGS. 12-13 describes use of a query tool of the search diagnostic tools.

Query Tool (Query Runner):

An automated query inquiry helps to automate the process of a user analyzing search queries. For example, a user would typically analyze a search query by typing the search query into a search bar and executing the search. The user would then review the search results returned based on the search query. If a user wanted to analyze a number of search queries, the user would need to repeat this process for each search query analyzed. In practice, a data analyst would compile a list of search queries (i.e., a "set of queries") to be analyzed. The user would then take the list and, one-by-one, enter the queries into the website, receive the search results, and review the search results. Depending on the length of the list, this process can be quite time consuming. Additionally, manually retrieving search queries, entering search queries, and searching based on search queries accounts for a substantial portion of the time required to execute the task.

The query tool helps automate much of this process. In some embodiments, the query tool is capable of acquiring a set of queries and automatically running searches associated with the queries in the set of queries. That is, the query tool iterates through the queries in the set of queries automatically for the user. During this process, the user can view the results associated with the search queries and take control of the process if he or she sees fit. For example, when the automated query inquiry is running, if the user sees search results that he or she feels are not appropriate for the search query, he or she can pause the automated query inquiry. Once the automated query inquiry is paused, the user can use any of the search diagnostic tools that he or she wishes to alter the search results based on the search query. The discussion of FIGS. 12-13 provides additional detail regarding such a query tool.

FIG. 12 depicts a webpage being presented via a web browser 1200 including a query tool 1204, according to some embodiments. The query tool 1204 includes controls for running an automated query inquiry. In some embodiments, the controls for running the automated query resemble the type of controls that would be found on a media player. For example, the controls for running an automated query inquiry depicted in FIG. 12 include a previous button 1206, a play button 1210, a pause button 1212, a next button 1214, and a shuffle button 1216. The previous button 1206 backs up to a previous query, the play button 1210 begins the automated query inquiry and/or resumes the automated query inquiry, the pause button 1212 pauses the automated query inquiry, the next button 1214 advances to a next query in the set of queries, and the shuffle button 1216 causes random selection of the queries from the set of queries.

In some embodiments, the controls for running the automated query inquiry also allow the user to select a specific query from the set of queries (i.e., a select button). For example, as depicted in FIG. 12, the user has selected the query "Query 2" 1218 from list of queries 1220. The list of queries 1220 presents at least some of the queries included in the set of queries. In some embodiments, the list of queries 1220 also includes information about queries in the set of queries. For example, as depicted in FIG. 12, the list of queries 1220 includes a score associated with each query (e.g., an average score of all search results for the query) and a number of searches performed using a search query (e.g., over a time period).

The list of queries 1220 can be populated in any suitable manner. In some embodiments, the query tool 1204 automatically populates the list of queries 1220. For example, the query tool 1204 can determine queries to include in the list of queries 1220 (i.e., which queries to include in a set of queries), with and/or without user input. In embodiments in which the user participates in the population of the set of queries, the user can specify which types of queries to include in the set of queries. In either case (i.e., with or without user input), the query tool 1204 can determine the set of queries based on any suitable criteria. For example, the query tool 1204 can determine the set of queries based on frequency of a query, volume of a query, average score for a query, revenue generated based on a query, margins for sales based on a query, click-through-rate for the query, add-to-cart rate for the query, page view rate, user rating, or any other suitable ranking criteria. In some embodiments, the query tool 1204 requests the set of queries from an analytics tool. For example, the query tool 1204 can request that the analytics tool provide a set of queries including the 100 most frequently searched queries.

While the discussion of FIG. 12 provides background information regarding a query tool, the discussion of FIG. 13 describes example operations for the query tool.

FIG. 13 is a flow chart depicting example operations for presenting search diagnostic tools in concert with a website, according to some embodiments. The flow begins at block 1302.

At block 1302, code for a website is stored. For example, a server can store the code for the website. The code for the website includes multiple code sets. In one embodiment, the code for the website includes two code sets: a first code set and a second code set. The first code set includes executable code for rendering the website including a search function and the second code set includes executable code for rendering a user interface integrated with the rendering of the web site. The user interface includes search diagnostic tools. The flow continues at block 1304.

At block 1304, signals are output based on the first code set. For example, the control circuit can output the signals based on the first code set. The signals based on the first code set cause rendering of the website by the user device. The rendering of the website includes the search results (i.e., the results of the search query). The flow continues at block 1306.

At block 1306, signals are output based on the second code set. For example, the control circuit can output the signals based on the second code set. The signals based on the second code set cause rendering of the user interface including the search diagnostic tools such that the user interface including the search diagnostic tools is presented with the results for the search query. For example, the search diagnostic tools can be presented next to, on top of, superimposed on, near, adjacent to, and/or in conjunction with the search results. The search diagnostic tools include a query tool including controls for running an automated query inquiry. The flow continues at block 1308.

At block 1308, user input is received to begin an automated query inquiry. For example, the user input can be received by the control circuit via the user interface. That is, the user can utilize the query tool to begin the automated query inquiry. Additionally, in embodiments in which the query tool includes additional controls, the user can perform other actions during the automated query inquiry, such as pausing the automated query inquiry. The flow continues at block 1310.

At block 1310, a set of queries is determined. For example, the control circuit can determine the set of queries. In some embodiments, the control circuit determines the set of queries based on user input defining types of queries to be included in the query set. For example, the user may indicate that he or she wants to include the top 100 queries by volume in the query set. Additionally, in some embodiments, the query set can be generated by an analytics tool. In such embodiments, the control circuit requests the set of queries from the analytics tool.

After the set of queries is determined, the flow continues by iterating through the queries in the set of queries. These operations are depicted in block 1314-1318. That is, for each of the queries in the query set (assuming the user has not taken over control and ended the automated query inquiry), the operations depicted in blocks 1314-1318 are performed automatically.

At block 1314, a search query is transmitted. For example, the control circuit can transmit the search query to a search engine. The search query is one of the queries from the query set. The flow continues at block 1316.

At block 1316, search results are received. For example, the control circuit can receive the search results from the search engine. The search results are based on the search query from the set of queries. The flow continues at block 1318.

At block 1318, signals are output to cause rendering of the website including the search results and the user interface. For example, the control circuit can output the signals to cause rendering of the website including the search results and the user interface. As the search queries in the set of queries are iterated through, the user is presented, via the website, with the search results for the queries. The user can take control of the automated query inquiry if he or she chooses. The user can take control by simply pausing the automated query inquiry, moving to the next, or previous, query in the query set, changing the order in which the automated query inquiry iterates through the set of queries, etc. Additionally, in some embodiments, the user can utilize others of the search diagnostic tools to modify the search queries. For example, if during the automated query inquiry the user sees search results that he or she does not think belong or are not relevant, he or she can take control of the automated query inquiry and alter the search results.

CONCLUSION

Described herein are systems, methods, and apparatuses for presenting search diagnostic tools in concert with a website. While a number of specific search diagnostic tools are presented separately, it should be noted that the search diagnostic tools presented in concert with a website can include any one of the aforementioned search diagnostic tools, any combination of multiple ones of the search diagnostic tools, and/or any other search diagnostic tools not described herein. Additionally, while most examples described herein relate to a website for selling goods and/or services, embodiments are not so limited. The systems, apparatuses, and methods described herein can be incorporated with any website that provides a search function.

Although the examples of the systems, methods, and apparatuses used herein refer to the search functionality of a website, in some embodiments, these systems, methods, and apparatuses can be used with search functions that are not related to or incorporated with websites. For example, the search diagnostic tools described herein can be used to search a database or other repository. In such embodiments, the user interface provides the search diagnostic tools for use with the database or other repository. Put simply, the user interface and search diagnostic tools described herein can be incorporated with any system that allows users to search for data.

In some embodiments, a system for presenting search diagnostic tools in concert with a website comprises a server, wherein the server stores code for a website including a search function for users of the website, wherein the code for the website includes a first code set and a second code set, wherein the first code set includes executable code for rendering the website including the search function and the second code set includes executable code for rendering a user interface integrated with the rendering of the website, and wherein the user interface includes search diagnostic tools for the website, and a control circuit, wherein the control circuit is configured to receive, from a user, a search query, receive, from a search engine, results for the search query, output based on execution of the first code set, signals to cause rendering of the website, wherein the website includes the results for the search query, and output, based on execution of the second code set, signals to cause rendering of the user interface including the search diagnostic tools such that the user interface including the search diagnostic tools is presenting with the search results for the search query.

In some embodiments, an apparatus and a corresponding method performed by the apparatus comprises storing, at a server, code for a website including a search function for users of the website, wherein the code for the website includes a first code set and a second code set, wherein the first code set includes executable code for rendering the website including the search function and the second code set includes executable code for rendering a user interface integrated with the rendering of the website, and wherein the user interface includes search diagnostic tools for the website, receiving, at a control circuit from a user, a search query, receiving, at the control circuit from a search engine, results for the search query, outputting, by the control circuit based on execution of the first code set, signals to cause rendering of the website, wherein the website includes the results for the search query, and outputting, by the control circuit based on execution of the second code set, signals to cause rendering of the user interface including the search diagnostic tools such that the user interface including the search diagnostic tools is presenting with the search results for the search query.

In some embodiments, a system for modifying search queries comprises a server, wherein the server stores code for a website including a search function for users of the website, wherein the code for the web site includes a first code set and a second code set, and wherein the first code set includes executable code for rendering the website including the search function and the second code set includes executable code for rendering a user interface integrated with the rendering of the website, and wherein the user interface includes search diagnostic tools for the web site, a control circuit, wherein the control circuit is configured to receive, from a user, a search query, receive, from a search engine, results for the search query, output based on execution of the first code set, signals to cause rendering of the website, wherein the website includes the results for the search query, output, based on execution of the second code set, signals to cause rendering of the user interface including the search diagnostic tools such that the user interface including the search diagnostic tools is presented with the search results for the search query, wherein the search diagnostic tools include a search explanation tool configured to receive diagnostic requests for explanations relating to rendered search results, receive, via the search explanation tool, an indication of a modification to the search query, wherein the modification to the search query incudes a request for explanation, generate, based on the indication of the modification for the search query, a modified search query, and wherein, upon submission of the search query by the user, the search engine receives the modified search query.

In some embodiments of the system, the request for explanation requests an explanation from the search engine as to why one or more results for the search query were included.

In some embodiments of the system, in response to receipt of the request for explanation, the search engine provides one or more of a normalized discounted cumulative gain (NDCG) score, a list of matching terms, a ranking, summary, a list of matching products, a list of matching records, a summary for textual matching of terms to records across various fields a record's data, a summary of a ranking of a record among others who match similarly, spell corrections, synonym expansions, and stemming In some embodiments of the system, the user interface includes an explanation selection for each of the results for the search query, and wherein the explanation selection for each of the results for the search query is presented in conjunction with one of the results for the search query.

In some embodiments of the system, the explanation selection for each of the results of the search query is viewable by the user and an end user.

In some embodiments of the system, the control circuit is further configured to receive, from the user, authorization information and confirm, based on the authorization information, that the user is authorized to access the second code set.

In some embodiments of the system, the authorization information includes a username and a password.

In some embodiments of the system, the control circuit is further configured to receive, by the control circuit in response to the modified search query, data explaining why a search result was included in the results for the search and output signals to cause rendering of a dialogue, wherein the dialogue includes the data explaining why a search result was included in the results for the search.

In some embodiments of the system, the system further comprises the search engine, wherein the search engine is configured to, upon receipt of the modified search query, return data explaining why a search result was included in the results for the search.

In some embodiments, an apparatus and a corresponding method performed by the apparatus comprises storing, at a server, code for a website including a search function for users of the website, wherein the code for the website includes a first code set and a second code set, wherein the first code set includes executable code for rendering the website including the search function and the second code set includes executable code for rendering a user interface integrated with the rendering of the website, and wherein the user interface includes search diagnostic tools for the website, receiving, at a control circuit from a user, a search query, receiving, at the control circuit from a search engine, results for the search query, outputting, by the control circuit based on execution of the first code set, signals to cause rendering of the website, wherein the website includes the results for the search query, outputting, by the control circuit based on execution of the second code set, signals to cause rendering of the user interface including the search diagnostic tools such that the user interface including the search modifications tools is presented with the search results for the search query, wherein the search diagnostic tools include a search explanation tool configured to receive diagnostic requests for explanations relating to rendered search results, receiving, via the search explanation tool, an indication of a modification to the search query, wherein the modification to the search query incudes a request for explanation, generating, based on the indication of the modification for the search query, a modified search query, receiving, at the control circuit, submission of the search query, and transmitting, to the search engine in response to the receiving the search query, the modified search query.

In some embodiments of the method, the request for explanation requests an explanation from the search engine as to why one or more results from the search query were included.

In some embodiments of the method, in response to receipt of the request for explanation, the search engine provides one or more of a normalized discounted cumulative gain (NDCG) score, a list of matching terms, a ranking, summary, a list of matching products, a list of matching records, a summary for textual matching of terms to records across various fields a record's data, a summary of a ranking of a record among others who match similarly, spell corrections, synonym expansions, and stemming.

In some embodiments of the method, the user interface includes an explanation selection for each of the results for the search query, and wherein the explanation selection for each of the results for the search query is presented in conjunction with one of the results for the search query.

In some embodiments of the method, the explanation selection for each of the results of the search query is viewable by the user and an end user.

In some embodiments, the method further comprises receiving, from the user, authorization information and confirming, based on the authorization information, that the user is authorized to access the second code set.

In some embodiments of the method, the authorization information includes a username and a password.

In some embodiments, the method further comprises receiving, by the control circuit in response to the modified search query, data explaining why a search result was included in the results for the search and outputting signals to cause rendering of a dialogue, wherein the dialogue includes the data explaining why a search result was included in the results for the search.

In some embodiments, the method further comprises returning, by the search engine in response to receipt of the modified search query, data explaining why a search result was included in the results for the search.

In some embodiments, a system for modifying search queries comprises a server, wherein the server stores code for a website including a search function for users of the website, wherein the code for the web site includes a first code set and a second code set, wherein the first code set includes executable code for rendering the website including the search function and the second code set includes executable code for rendering a user interface integrated with the rendering of the website, and wherein the user interface includes search diagnostic tools for the website, a key value store, wherein the key value store includes modified search queries corresponding to filter values, and a control circuit, wherein the control circuit is configured to receive, from a user, a search query, receive, from a search engine, results for the search query, output based on execution of the first code set, signals to cause rendering of the website, wherein the website includes the results for the search query, output, based on execution of the second code set, signals to cause rendering of the user interface including the search diagnostic tools such that the user interface including the search diagnostic tools is presented with the search results for the search query, wherein the search diagnostic tools include a filter tool configured to control filtering of the results for the search query, receive, via the filter tool, an indication of a modification to the search query, wherein the modification to the search query includes a filtering of the results for the search query, generate, based on the indication of the modification for the search query, a modified search query, transmit, for storage in the key value store, an indication of the modification for the search query, wherein, upon submission of the search query by an end user, the search engine receives the modified search query.

In some embodiments of the system, the filter values are normalized discounted cumulative gain (NDCG) scores.

In some embodiments of the system, the filtering of the results for the search query is based on one of the NDCG scores included in the key value store.

In some embodiments of the system, the user interface includes a filtering toggle, wherein selection of the filtering toggle turns the filtering of the results for the search query on and off.

In some embodiments of the system, search results based on the modified search query exclude ones of the results for the search query having values below a threshold.

In some embodiments of the system, the control circuit is further configured to receive, via the user interface including the search diagnostic tools, an indication of a filter value for the search query.

In some embodiments of the system, the modified search query includes the indication of the filter value for the search query.

In some embodiments of the system, the control circuit is further configured to receive, from the user, authorization information and confirm, based on the authorization information, that the user is authorized to access the second code set.

In some embodiments of the system, the authorization information includes a username and a password.

In some embodiments, the system further comprises a client device, wherein the end user submits the search query via the client device, and wherein the client device is configured to present the website including modified search results based on the modified search query.

In some embodiments, an apparatus and a corresponding method performed by the apparatus comprises storing, at a server, code for a website including a search function for users of the website, wherein the code for the website includes a first code set and a second code set, wherein the first code set includes executable code for rendering the website including the search function and the second code set includes executable code for rendering a user interface integrated with the rendering of the website, and wherein the user interface includes search modification tools for the website, storing, at a key value store, filter values for search queries, receiving, at a control circuit from a user, a search query, receiving, at the control circuit from a search engine, results for the search query, outputting, by the control circuit based on execution of the first code set, signals to cause rendering of the website, wherein the website includes the results for the search query, outputting, by the control circuit based on execution of the second code set, signals to cause rendering of the user interface including the search diagnostic tools such that the user interface including the search modifications tools is presented with the search results for the search query, wherein the search diagnostic tools include a filter tool configured to control filtering of the results for the search query, receiving, via the filter tool, an indication of a modification to the search query, wherein the modification to the search inquiry includes a filtering of the results for the search query, generating, based on the indication of the modification for the search query, a modified search query, transmitting, for storage in the key value store, the modified search query, receiving, at the control circuit, submission of the search query from an end user, and transmitting, to the search engine in response to the receiving the search query, the modified search query.

In some embodiments of the method, the filter values for search queries are normalized discounted gain (NDCG) scores.

In some embodiments of the method, the filtering of the results for the search query is based on one of the NDCG scores in a database.

In some embodiments of the method, the user interface includes a filtering toggle, and wherein selection of the filtering toggle turns the filtering of the results for the search query on and off.

In some embodiments of the method, search results based on the modified search query exclude ones of the results for the search query having values below a threshold.

In some embodiments, the method further comprises receiving, via the user interface including the search diagnostic tools, an indication of a filter value for the search query.

In some embodiments of the method, the modified search query includes the indication of the filter value for the search query.

In some embodiments, the method further comprises receiving, from the user, authorization information and confirming, based on the authorization information, that the user is authorized to access the second code set.

In some embodiments of the method, the authorization information includes a username and a password.

In some embodiments, the method further comprises receiving, at a client device, submission of the search query and presenting, by the client device, the website including modified search results based on the modified search query.

In some embodiments, a system for presenting search diagnostic tools in concert with a website comprises a server, wherein the server stores code for a website including a search function for users of the website, wherein the code for the website includes a first code set and a second code set, wherein the first code set includes executable code for rendering the website including the search function and the second code set includes executable code for rendering a user interface integrated with the rendering of the website, and wherein the user interface includes search diagnostic tools for the website, a key value store, wherein the key value store includes a mapping between search queries and modified search queries, and a control circuit, wherein the control circuit is configured to receive, from a user, a search query, receive, from a search engine, results for the search query, output based on execution of the first code set, signals to cause rendering of the website, wherein the website includes the results for the search query, output, based on execution of the second code set, signals to cause rendering of the user interface including the search diagnostic tools such that the user interface including the search diagnostic tools is presented with the search results for the search query, wherein the search diagnostic tools include a prioritization tool configured to control prioritization of the results for the search query, receive, via the prioritization tool, an indication of a modification to the search query, wherein the modification to the search query includes one of boosting a search result and burying a search result, generate, based on the indication of the modification for the search query, a modified search query, transmit, for storage in the key value store, the modified search query, wherein, upon submission of the search query by an end user, the search engine receives the modified search query.

In some embodiments of the system, the modification for the search query is a boost of a first search result, and wherein the modified search query positively includes a product identifier for the first search result.

In some embodiments of the system, the modification for the search query is a bury of a first search result, and wherein the modified search query negatively includes a product identifier for the first search result.

In some embodiments of the system, the search diagnostic tools include a first selection and a second selection, wherein the first selection and the second selection are associated with a first search result, and wherein selection of one of the first selection and the second selection causes the first search result to be one of boosted and buried.

In some embodiments of the system, the control circuit is further configured to receive, from the user, authorization information and confirm, based on the authorization information, that the user is authorized to access the second code set.

In some embodiments of the system, the authorization information includes a username and a password.

In some embodiments of the system, the control circuit is further configured to determine, upon submission of the search query by the end user based on access to the key value store, the modified search query, wherein the control circuit transmits the modified search query to the search engine.

In some embodiments the system further comprises a user device, wherein the end user submits the search query via the user device, and wherein the user device is configured to present the website including modified search results based on the modified search query.

In some embodiments, the system further comprises a database, wherein the database stores the search queries, the modified search queries, and information related to the search queries and the modified search queries.

In some embodiments of the system, the control circuit is further configured to save, in the database, an association between the search query and the modified search query.

In some embodiments, an apparatus and a corresponding method performed by the apparatus comprises storing, at a server, code for a website including a search function for users of the website, wherein the code for the website includes a first code set and a second code set, wherein the first code set includes executable code for rendering the website including the search function and the second code set includes executable code for rendering a user interface integrated with the rendering of the website, and wherein the user interface includes search modification tools for the website, storing, at a key value store, a mapping between search queries and modified search queries, receiving, at a control circuit from a user, a search query, receiving, at the control circuit from a search engine, results for the search query, outputting, by the control circuit based on execution of the first code set, signals to cause rendering of the website, wherein the website includes the results for the search query, outputting, by the control circuit based on execution of the second code set, signals to cause rendering of the user interface including the search diagnostic tools such that the user interface including the search diagnostic tools is presented with the search results for the search query, wherein the search diagnostic tools include a prioritization tool configured to control prioritization of the results for the search query, receiving, via the prioritization tool, an indication of a modification to the search query, wherein the modification to the search inquiry includes one of boosting a search result and burying a search result, generating, based on the indication of the modification for the search query, a modified search query, transmitting, for storage in the key value store, the modified search query, receiving, at the control circuit, submission of the search query from an end user, transmitting, to the search engine in response to the receiving the search query, the modified search query.

In some embodiments of the method, the modification for the search query is a boost of a first search result, and wherein the modified search query positively includes a product identifier for the first search result.

In some embodiments of the method, the modification for the search query is a bury of a first search result, and wherein the modified search query negatively includes a product identifier for the first search result.

In some embodiments of the method, the search diagnostic tools include a first selection and a second selection, wherein the first selection and the second selection are associated with a first search result, and wherein selection of one of the first selection and the second selection causes the first search result to be one of boosted and buried.

In some embodiments, the method further comprises receiving, from the user, authorization information and confirming, based on the authorization information, that the user is authorized to access the second code set.

In some embodiments of the method, the authorization information includes a username and a password.

In some embodiments, the method further comprises determining, upon submission of the search query by the end user based on access to the key value store, the modified search query, wherein the control circuit transmits the modified search query to the search engine.

In some embodiments, the method further comprises receiving, at a user device, submission of the search query and presenting, by the user device, the website including modified search results based on the modified search query.

In some embodiments, the method further comprises storing, in a database, the search queries, the modified search queries, and information related to the search queries and the modified search queries.

In some embodiments, the method further comprises saving, in the database, an association between the search query and the modified search query.

In some embodiments, a system for presenting search diagnostic tools in concert with a website comprises a server, wherein the server stores code for a website including a search function for users of the website, wherein the code for the website includes a first code set and a second code set, wherein the first code set includes executable code for rendering the website including the search function and the second code set includes executable code for rendering a user interface integrated with the rendering of the website, and wherein the user interface includes search diagnostic tools for the website, a control circuit, wherein the control circuit is configured to output based on execution of the first code set, signals to cause rendering of the website, output, based on execution of the second code set, signals to cause rendering of the user interface including the search diagnostic tools such that the user interface including the search diagnostic tools is presented with the website, wherein the search diagnostic tools include a query tool, and wherein the query tool includes controls for running an automated query inquiry, receive, via the user interface from a user, user input to begin the automated query inquiry, determine, in response to the selection of the query tool, a set of queries, for each query in the set of queries until further user input is received transmit, to a search engine, the query, receive, from the search engine, query results, and output, based on the query results, signals to cause rendering of the website including the query results and the user interface including the search diagnostic tools.

In some embodiments of the system, the controls for running the automated query inquiry include a play button, a pause button, a next button, a previous button, a shuffle button, and a select button.

In some embodiments of the system, the play button begins the automated query inquiry, the pause button pauses the automated query inquiry, the next button advances to a next query in the set of queries, the previous button backs up to a previous query, the shuffle button causes random selection of queries from the set of queries, and the select button allows selection of a specific query from the set of queries.

In some embodiments of the system, the search diagnostic tools include one or more of a boost tool, a bury tool, a filtering tool, and a request for explanation tool.

In some embodiments of the system, the user is able to perform at least one of the search diagnostic tools when the automated query inquiry is paused.

In some embodiments of the system, the control circuit is further configured to receive, from the user, authorization information and confirm, based on the authorization information, that the user is authorized to access the second code set.

In some embodiments of the system, the authorization information includes a username and a password.

In some embodiments of the system, the control circuit determines the set of queries based on one or more of frequency, volume, average score, revenue, margins, click-through-rate, and add-to-cart rate, page view rate, and user rating.

In some embodiments, the system further comprises an analytics tool, wherein the analytics tool is configured to receive, from the control circuit, a request for the set of queries, generate, based on the request for the set of queries, the set of queries, and transmit, to the control circuit, the set of queries.

In some embodiments, an apparatus and a corresponding method performed by the apparatus comprises storing, at a server, code for a website including a search function for users of the website, wherein the code for the website includes a first code set and a second code set, wherein the first code set includes executable code for rendering the website including the search function and the second code set includes executable code for rendering a user interface integrated with the rendering of the website, and wherein the user interface includes search diagnostic tools for the website, outputting, by the control circuit based on execution of the first code set, signals to cause rendering of the website, outputting, by the control circuit based on execution of the second code set, signals to cause rendering of the user interface including the search diagnostic tools such that the user interface including the search diagnostic tools are presented with the website, wherein the search diagnostic tools include a query tool, and wherein the query tool includes controls for running an automated query inquiry, receiving, via the user interface from a user, user input to begin the automated query inquiry, determining, in response to the selection of the query tool, a set of queries, for each query in the set of queries until further user input is received transmitting, to a search engine, the query, receiving, from the search engine, query results, and outputting, based on the query results, signals to cause rendering of the website including the query results and the user interface including the search diagnostic tools.

In some embodiments of the method, the controls for running the automated query inquiry include a play button, a pause button, a next button, a previous button, a shuffle button, and a select button.

In some embodiments of the method, the play button begins the automated query inquiry, the pause button pauses the automated query inquiry, the next button advances to a next query in the set of queries, the previous button backs up to a previous query, the shuffle button causes random selection of queries from the set of queries, and the select button allows selection of a specific query from the set of queries.

In some embodiments of the method, the search diagnostic tools include one or more of a boost tool, a bury tool, a filtering tool, and a request for explanation tool.

In some embodiments of the method, the user is able to perform at least one of the search diagnostic tools when the automated query inquiry is paused.

In some embodiments, the method further comprises receiving, from the user, authorization information and confirming, based on the authorization information, that the user is authorized to access the second code set.

In some embodiments of the method, wherein the authorization information includes a username and a password.

In some embodiments of the method, the control circuit determines the set of queries based on based on one or more of frequency, volume, average score, revenue, margins, click-through-rate, add-to-cart rate, page view rate, and user rating.

In some embodiments, the method further comprises receiving, by an analytics tool, a request for a set of queries, generating, based on the request for the set of queries, the set of queries, and transmitting, to the control circuit, the set of queries.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for presenting search diagnostic tools in concert with a website, the system comprising:
  a server, wherein the server stores code for a website including a search function for users of the website, wherein the code for the website includes a first code set and a second code set, wherein the first code set includes executable code for rendering the website including the search function and the second code set includes executable code for rendering a user interface integrated with the rendering of the website, wherein the user interface includes search diagnostic tools for the website, and wherein the search diagnostic tools are configured to receive input from an authorized user to modify search queries provided by the users of the website before they are passed to a search engine; and a control circuit, wherein the control circuit is configured to:
  receive, from the authorized user, a search query;
  receive, from a search engine, results for the search query;
  output based on execution of the first code set, signals to cause rendering of the website, wherein the website includes the results for the search query;
  output, based on execution of the second code set, signals to cause rendering of the user interface including the search diagnostic tools such that the user interface including the search diagnostic tools is presented with the results for the search query;
  receive, from an end user, a second search query, wherein the end user is one of the users of the website;
  modify, based on previously received input from the authorized user via the search diagnostic tools, the second search query to form a modified search query;
  transmit, to the search engine, the modified search query;
  receive, from the search engine, results of the modified search query; and
  output, based on execution of the first code set, signals to cause rendering of the website, wherein the website includes the results of the modified search query.

2. The system of claim 1, wherein the control circuit is further configured to:
  receive, from the authorized user, authorization information; and
  confirm, based on the authorization information, that the authorized user is authorized to access the second code set.

3. The system of claim 2, wherein the control circuit is further configured to:
  upon receipt of a specific entry from the authorized user, present, in concert with the website, an authorization prompt, wherein the authorization prompt allows the authorized user to input the authorization information.

4. The system of claim 2, wherein the authorization information includes a username and a password.

5. The system of claim 2, wherein the authorization information is based on a network through which the user accesses the server.

6. The system of claim 1, further comprising:
  a key value store, wherein the key value store includes a mapping between search queries and modified search queries;
  wherein the control circuit is further configured to:
    receive, via the user interface including the search diagnostic tools, an indication of a modification for the search query;
    generate, based on the indication of the modification for the search query, a modified search query, wherein the modified search query is based on the search query;
    transmit, for storage in the key value store, the modified search query;
  wherein, upon submission of the search query by an end user, the search engine receives the modified search query, wherein the end user is one of the users of the website.

7. The system of claim 6, wherein the control circuit is further configured to:
  determine, upon submission of the search query by the end user based on access to the key value store, the modified search query, wherein the control circuit transmits the modified search query to the search engine.

8. The system of claim 6, further comprising:
  a client device, wherein the end user submits the search query via the client device, and wherein the client device is configured to:
    present the website including modified search results based on the modified search query.

9. The system of claim 6, wherein the modified search query includes one or more of additions to the search query and deletions from the search query.

10. The system of claim 6, further comprising:
  a database, wherein the database stores the search queries, the modified search queries, and information related to the search queries and the modified search queries.

11. A method for modifying search queries, the method comprising:
  storing, at a server, code for a web site including a search function for users of the web site, wherein the code for the web site includes a first code set and a second code set, wherein the first code set includes executable code for rendering the website including the search function and the second code set includes executable code for rendering a user interface integrated with the rendering of the web site, wherein the user interface includes search diagnostic tools for the website, and wherein the search diagnostic tools are configured to receive input from an authorized user to modify search queries provided by the users of the web site before they are passed to a search engine;
  receiving, at a control circuit from the authorized user, a search query;
  receiving, at the control circuit from a search engine, results for the search query;
  outputting, by the control circuit based on execution of the first code set, signals to cause rendering of the website, wherein the website includes the results for the search query;
  outputting, by the control circuit based on execution of the second code set, signals to cause rendering of the user interface including the search diagnostic tools such that the user interface including the search diagnostic tools is presented with the search results for the search query;
  receiving, by the control circuit from an end user, a second search query, wherein the end user is one of the users of the website;
  modifying, by the control circuit based on previously received input from the authorized user via the search diagnostic tools, the second search query to form a modified search query;
  transmitting, to a search engine, the modified search query;
  receiving, from the search engine, results of the modified search query; and outputting, based on execution of the first code set, signals to cause rendering of the website, wherein the website includes the results for the modified search.

12. The method of claim 11, further comprising:
receiving, from the authorized user, authorization information; and
confirming, based on the authorization information, that the authorized user is authorized to access the second code set.

13. The method of claim 12, further comprising:
upon receipt of specific entry from the authorized user, present, in concert with the website, an authorization prompt, wherein the authorization prompt allows the authorized user to input the authorization information.

14. The method of claim 12, wherein the authorization information includes a username and password.

15. The method of claim 12, wherein the authorization information is based on a network through which the user accesses the server.

16. The method of claim 11, further comprising:
storing, in a key value store, a mapping between search queries and modified search queries;
receiving, via the user interface including the search diagnostic tools, an indication of a modification for the search query;
generating, based on the indication of the modification for the search query, a modified search query, wherein the modified search query is based on the search query;
transmitting, for storage in the key value store, the modified search query; and
upon submission of the search query by an end user, transmitting the modified search query to the search engine, wherein the end user is one of the users of the website.

17. The method of claim 16, further comprising:
determining, upon submission of the search query by the end user based on access to the key value store, the modified search query.

18. The method of claim 16, further comprising:
presenting, by a client device, the website including modified search results based on the modified search query.

19. The method of claim 16, wherein the modified search query includes one or more of additions to the search query and deletions from the search query.

20. The method of claim 16, further comprising:
storing, in a database, the search queries, the modified search queries, and information related to the search queries and the modified search queries.

21. The system of claim 1, wherein the control circuit is further configured to:
modify the search query received from the end user based on a stored modified search query corresponding to the previously received input from the authorized user via the search diagnostic tools.

22. The method of claim 11, further comprising:
modifying the search query received from the end user based on a stored modified search query corresponding to the previously received input from the authorized user via the search diagnostic tool.

* * * * *